United States Patent
Veitsel et al.

(10) Patent No.: US 9,664,792 B2
(45) Date of Patent: May 30, 2017

(54) POSITIONING QUALITY OF GLOBAL NAVIGATION SATELLITE SYSTEM RECEIVERS

(75) Inventors: Vladimir Viktorovich Veitsel, Moscow (RU); Mark Isaakovich Zhodzishsky, Moscow (RU); Viktor Abramovich Veitsel, Moscow (RU); Andrey Vladimirovich Veitsel, Moscow (RU); Dmitry Pavlovich Nikitin, Moscow (RU); Andrey Valeryevich Plenkin, Moscow Rigion (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 761 days.

(21) Appl. No.: 14/125,197

(22) PCT Filed: Feb. 17, 2012

(86) PCT No.: PCT/RU2012/000113
§ 371 (c)(1),
(2), (4) Date: Dec. 10, 2013

(87) PCT Pub. No.: WO2013/122498
PCT Pub. Date: Aug. 22, 2013

(65) Prior Publication Data
US 2014/0132445 A1   May 15, 2014

(51) Int. Cl.
*G01S 19/13* (2010.01)
*G01S 19/09* (2010.01)
(Continued)

(52) U.S. Cl.
CPC .............. *G01S 19/13* (2013.01); *G01S 19/41* (2013.01); *G01S 19/426* (2013.01); *G01S 19/43* (2013.01)

(58) Field of Classification Search
USPC ............ 342/357.21, 357.24, 357.46, 357.51; 701/469, 470
See application file for complete search history.

(56) References Cited

U.S. PATENT DOCUMENTS

| | | | |
|---|---|---|---|
| 5,410,750 A | 4/1995 | Cantwell et al. | |
| 5,901,183 A | 5/1999 | Garin et al. | |
| (Continued) | | | |

FOREIGN PATENT DOCUMENTS

| | | |
|---|---|---|
| RU | 2389037 C2 | 5/2010 |
| WO | 9500861 A1 | 1/1995 |
| WO | 2005114250 A1 | 12/2005 |

OTHER PUBLICATIONS

Veitsel et al., "The Mitigation of Multipath Errors by Strobe Correlators in GPS/GLONASS Receivers". GPS Solutions, vol. 2, No. 2, 1998, pp. 38-45.
(Continued)

*Primary Examiner* — Dao Phan
(74) *Attorney, Agent, or Firm* — Chiesa Shahinian & Giantomasi PC

(57) ABSTRACT

A navigation receiver operating in a differential navigation mode can change from one solution type to another. At each epoch, primary estimates of coordinates and the solution type are received. Each solution type has a corresponding accuracy. To improve the positioning quality when the solution type changes, smoothed estimates of coordinates are generated according to a two-branch algorithm. Two conditions are evaluated. If both conditions are satisfied, the current-epoch smoothed estimates of coordinates are set equal to the current-epoch extended estimates of coordinates calculated from the sum of the previous smoothed estimates of coordinates and coordinate increments calculated from carrier phases. If at least one of the conditions is not satisfied, updated smoothed estimates of coordinates are
(Continued)

generated based on the sum of the current-epoch extended estimates of coordinates and a correction signal.

30 Claims, 21 Drawing Sheets

(51) Int. Cl.
    *G01S 19/43*     (2010.01)
    *G01S 19/41*     (2010.01)
    *G01S 19/42*     (2010.01)

(56) References Cited

U.S. PATENT DOCUMENTS

| | | |
|---|---|---|
| 6,337,657 B1 | 1/2002 | Zhodzishsky et al. |
| 6,397,147 B1 | 5/2002 | Whitehead |
| 6,493,378 B1 | 12/2002 | Zhodzishsky et al. |
| 6,664,923 B1 | 12/2003 | Ford |
| 6,861,979 B1 | 3/2005 | Zhodzishsky et al. |
| 7,153,559 B2 | 12/2006 | Ito et al. |
| 7,193,559 B2 | 3/2007 | Ford et al. |
| 7,212,155 B2 | 5/2007 | Hatch et al. |
| 7,439,908 B1 | 10/2008 | Zhodzishsky et al. |
| 7,522,099 B2 | 4/2009 | Zhodzishsky et al. |
| 7,710,316 B1 | 5/2010 | Zhodzishsky et al. |
| 2002/0111717 A1 | 8/2002 | Scherzinger et al. |
| 2011/0115669 A1 | 5/2011 | Milyutin et al. |

OTHER PUBLICATIONS

Zhdanov et al., "Multipath Error Reduction in Signal Processing". ION GPS '99, Sep. 14-17, 1999, Nashville, TN, pp. 1217-1223.
International Search Report dated Nov. 22, 2012, issued for corresponding application No. PCT/RU2012/000113, 2 pgs.
International Written Opinion dated Nov. 22, 2012, issued for corresponding application No. PCT/RU2012/000113, 5 pgs.
Extended European Search Report mailed Nov. 11, 2015, in connection with European Patent Application No. 12868524.5, 6 pages.

| VARIANT | CLASSIFICATION METHOD | NONLINEARITY TYPE | RULES FOR SETTING FUNCTIONAL TRANSFORMATION PARAMETERS |
|---|---|---|---|
| 1 | (I) | E(9) | $K_{1(i)} = K_1[AR_{(i)}];$ $\delta_{h1(i)} = \delta_{h1}[AR_{(i)}];$ $U_{1(i)} = \text{VAR}$ |
| 2 | (II) | E(11) | $K_3 = \text{CONST};$ $\delta_{h3} = \text{CONST};$ $n = \text{VAR}$ |
| 3 | (II) | E(10) | $K_{2(i)} = K_2[t_{(i)}];$ $\delta_{h2} = \text{CONST};$ $U_2 = \text{CONST}$ |

TABLE 1.

MODE: OmniSTAR
VARIANT: 1
CLASSIFICATION METHOD: (I)

| SOLUTION TYPE | VALUES OF *AR* |
|---|---|
| OmniSTAR-HP | *AR* = 1 |
| OmniSTAR-VBS | *AR* = 2 |
| STAND-ALONE | *AR* = 3 |

502 → (SOLUTION TYPE)
504 → (VALUES OF *AR*)

TABLE 2.

FIG. 6

MODE: OmniSTAR
VARIANT: 1
CLASSIFICATION METHOD: (I)
FUNCTIONAL TRANSFORMATION: (E9)

| PARAMETERS OF FUNCTIONAL TRANSFORMATION <br> ← 602 | VALUES FOR $AR = 1$ <br> ← 604 | VALUES FOR $AR = 2$ <br> ← 606 |
|---|---|---|
| LIMIT THRESHOLD (m) | $\delta_{h1} = 0.1$ | $\delta_{h1} = 0.3$ |
| TRANSFER GAIN (Hz) | $K_1 = 0.1$ | $K_1 = 0.003$ |
| LIMIT LEVEL (m/s) | $U_1 = 0.01$ | $U_1 = 0.003$ |

TABLE 3.

FIG. 7

MODE: OmniSTAR
VARIANT: 2
CLASSIFICATION METHOD: (II)

| SOLUTION TYPE | VALUES OF *AR* |
|---|---|
| OmniSTAR-HP | $AR = 1$ |
| OmniSTAR-VBS | $AR = 2$ |
| STAND-ALONE | $AR = 2$ |

TABLE 4.

FIG. 9

MODE: OmniSTAR AND DGPS
VARIANT: 3
CLASSIFICATION METHOD: (II)

| MODE | SOLUTION TYPE | VALUES OF $AR$ |
|---|---|---|
| OmniSTAR | OmniSTAR-HP | $AR = 1$ |
| | OmniSTAR-VBS | $AR = 2$ |
| | STAND-ALONE | $AR = 2$ |
| DGPS | DGPS | $AR = 1$ |
| | STAND-ALONE | $AR = 2$ |

TABLE 6.

FIG. 10B

MODE: OmniSTAR AND DGPS
VARIANT: 3
CLASSIFICATION METHOD: (II)
FUNCTIONAL TRANSFORMATION: (E10)

PARAMETER OF FUNCTIONAL TRANSFORMATION: TRANSFER GAIN

| TIME INTERVAL | | TIME (S) | $K_2$ (Hz) |
|---|---|---|---|
| FIRST TIME INTERVAL | | $t_i \leq 300$ | 0.01 |
| | | $t_i > 300$ | 0.001 |
| SUBSEQUENT TIME INTERVALS | | $t_i \leq 30$ | 0.0005 |
| | | $30 < t_i \leq 500$ | 0.003 |
| | | $50 < t_i \leq 1000$ | 0.01 |
| | | $1000 < t_i \leq 2000$ | 0.005 |
| | | $t_i > 2000$ | 0.0005 |

TABLE 7B.

POSITIONING QUALITY OF GLOBAL NAVIGATION SATELLITE SYSTEM RECEIVERS

BACKGROUND OF THE INVENTION

The present invention relates generally to global navigation satellite systems, and more particularly to improving the positioning quality of global navigation satellite system receivers operating in the differential navigation mode.

Global navigation satellite systems (GNSSs) can determine locations with high accuracy. Currently deployed GNSSs include the United States Global Positioning System (GPS) and the Russian GLONASS. Other GNSSs, such as the European GALILEO system, are under development. GNSSs are used in a wide range of applications, such as surveying, geology, and mapping. GNSS sensors estimating positions and velocities are also integrated into automatic control systems for agricultural and construction machines.

In a GNSS, a navigation receiver receives and processes radio signals transmitted by satellites located within a line-of-sight of the navigation receiver. The satellite signals comprise carrier signals modulated by pseudo-random binary codes. The navigation receiver measures the time delays of the received signals relative to a local reference clock. Code measurements enable the navigation receiver to determine the pseudo-ranges between the navigation receiver and the satellites. The pseudo-ranges differ from the actual ranges (distances) between the navigation receiver and the satellites due to various error sources and due to variations in the time scales of the satellites and the navigation receiver. If signals are received from a sufficiently large number of satellites, then the measured pseudo-ranges can be processed to determine the code coordinates and time scales at the navigation receiver. A single navigation receiver determining coordinates only from pseudo-ranges operates in a stand-alone mode. For a stand-alone system, the errors in the coordinates are on the order of tens of meters.

To improve the accuracy, stability, and reliability of measurements, differential navigation (DN) systems have been developed. In a DN system, the position of a user is determined relative to a base station (also referred to as a base) whose coordinates are precisely known. The base contains a navigation receiver that receives satellite signals. The user, whose position is to be determined, can be stationary or mobile and is often referred to as a rover. The rover also contains a navigation receiver that receives satellite signals. Results of base measurements are transmitted to the rover via a communications link. To accommodate a mobile rover, a wireless communications link is used.

The rover processes measurements taken with its own navigation receiver, along with measurements received from the base, to improve the accuracy of determining its position. Many of the errors in calculating coordinates from GNSS measurements, such as satellite clock drifts and signal propagation delays through the ionosphere and troposphere, are highly correlated at the rover and the base, if the rover and the base are sufficiently close.

Since the coordinates of the base are precisely known, errors of the GNSS measurements at the base can be computed by comparing the calculated coordinates to the known coordinates. The errors of base measurements can be used to correct the errors of rover measurements. Usually, a differential global positioning system (DGPS) computes locations based on pseudo-ranges only. With a navigation receiver operating in the DGPS mode, the errors in the rover coordinates are on the order of a meter. Other DN systems, discussed below, provide different accuracies for the coordinates.

In network DN systems, correction information for the rover is generated based on measurements from a group of base stations geographically dispersed over a wide region. A network control center processes the correction information from a particular group of base stations and transmits the correction information to the rover. One example of a network DN system is the commercial OmniSTAR DN system. OmniSTAR provides different grades of service with different accuracies.

Different methods for transmitting the correction information to the rover are used. Radio modems and geosynchronous satellites can be used to re-transmit or re-translate the correction information to the rover. The correction information can be sent over cellular radio channels or over satellite channels.

In the real-time kinematic (RTK) positioning mode, both code and carrier phase measurements at the base station are used for the correction information. The positioning accuracy of RTK systems is on the order of 1 centimeter. Other positioning methods use both code and carrier phase measurements.

U.S. Pat. No. 7,522,099 describes a method for determining the position of a rover relative to an initial location. The method calculates increments of rover coordinates for an epoch by using full phase increments for an epoch. The coordinate increments are added over the time elapsed from the departure time from the initial location. The coordinates relative to an initial location are referred to as local coordinates. Since the local coordinates are generated from coordinate increments that are based on carrier phase measurements, the local coordinates have a higher accuracy than coordinates based on code measurements alone. The determination of local coordinates can be useful for different applications; for example, in surveying locations and distances relative to a monument.

U.S. Pat. Nos. 7,710,316 and 7,439,908 describe the use of carrier phases to smooth coordinates obtained from code measurements. Measured carrier phase increments for an epoch are transformed into rover coordinate increments for an epoch. The coordinate increments and code measurements are then fed into a complex smoothing filter. Integration of the carrier phase and code measurements considerably reduces fluctuations of code coordinates during random motions of the rover, without increasing dynamic errors. Details of methods for measuring carrier phases and algorithms for generating coordinate increments and local coordinates are described in the above-mentioned patents.

To improve accuracy, particular filtering methods can be applied to the measurements. Different filtering methods are described in U.S. Pat. Nos. 7,439,908; 7,193,559; 7,710,316 B1; 7,153,559; 6,664,923; 7,439,908; 6,337,657; and 7,710,316. Filtration is most effective when there are no abnormal (anomalous) errors. U.S. Pat. Nos. 5,410,750 and 6,861,979 describe methods for handling anomalous errors. U.S. Pat. Nos. 5,901,183; 6,493,378; 7,212,155; and 6,397,147 describe methods for reducing specific types of errors.

When normal DN operation is disrupted, navigation receivers can switch to a different operational mode with lower accuracy. If a navigation receiver operating in the DGPS mode loses communication with the base station, for example, the navigation receiver can switch over to the stand-alone mode. Similarly, if the normal operation of a navigation receiver in a network DN system is disrupted, the navigation receiver, depending on the specific disruption, can switch over to a lower accuracy grade of service or to the stand-alone mode. Methods and apparatus for improving the positioning quality of navigation receivers when normal DN operation is disrupted are desirable.

BRIEF SUMMARY OF THE INVENTION

A navigation receiver operating in a differential navigation mode can change from one solution type to another solution type during operation. At each epoch, primary estimates of coordinates and the solution type are received from the navigation receiver. Each solution type has a corresponding accuracy of the primary estimates of coordinates. To improve the positioning quality when the solution type changes, smoothed estimates of coordinates are generated according to a two-branch algorithm.

At the first epoch, the first-epoch solution type is assigned a first-epoch group accuracy, and the first-epoch smoothed estimates of coordinates are set equal to the first-epoch primary estimates of coordinates. For each epoch after the first epoch, the following input is received: the smoothed estimates of coordinates calculated at the previous epoch, the current-epoch primary estimates of coordinates, and the current-epoch solution type.
The current-epoch solution type is assigned a current-epoch group accuracy.

Coordinate increments between coordinates at the current epoch and coordinates at the previous epoch are calculated from carrier phases of satellite signals received by the navigation receiver. Current-epoch extended estimates of coordinates are calculated from the sum of the previous smoothed estimates of coordinates and the coordinate increments. The last change epoch in which the group accuracy changed is determined. The elapsed time between the current epoch and the last change epoch is determined.

Two conditions are evaluated. The first condition is that, at the last change epoch, the group accuracy decreased. The second condition is that the elapsed time does not exceed a predetermined maximum value of elapsed time.

If both conditions are satisfied, then the current-epoch smoothed estimates of coordinates is set equal to the current-epoch extended estimates of coordinates. If at least one of the conditions is not satisfied, then an error signal is generated based on the difference between the current-epoch primary estimates of coordinates and the current-epoch extended estimates of coordinates. The error signal is functionally transformed into a correction signal. Updated smoothed estimates of coordinates are generated based on the sum of the current-epoch extended estimates of coordinates and the correction signal.

These and other advantages of the invention will be apparent to those of ordinary skill in the art by reference to the following detailed description and the accompanying drawings.

BRIEF DESCRIPTION OF THE DRAWINGS

FIG. 4 shows Table 1, which lists several combinations (Variant 1, Variant 2, and Variant 3) of classification methods, types of functional transformations, and rules for setting functional transformation parameters;

FIG. 5 shows Table 2, which lists available solution types and their assigned values of accuracy rating for an example of Variant 1;

FIG. 6 shows Table 3, which lists values of parameters of a particular functional transformation for an example of Variant 1;

FIG. 7 shows Table 4, which lists available solution types and their assigned values of accuracy rating for an example of Variant 2;

FIG. 9 shows Table 6, which lists available modes, available solution types, and their assigned values of accuracy rating for an example of Variant 3;

FIG. 10A and FIG. 10B show Table 7A and Table 7B, respectively, which list values of parameters of a particular functional transformation for an example of Variant 3;

DETAILED DESCRIPTION

Figure 1:
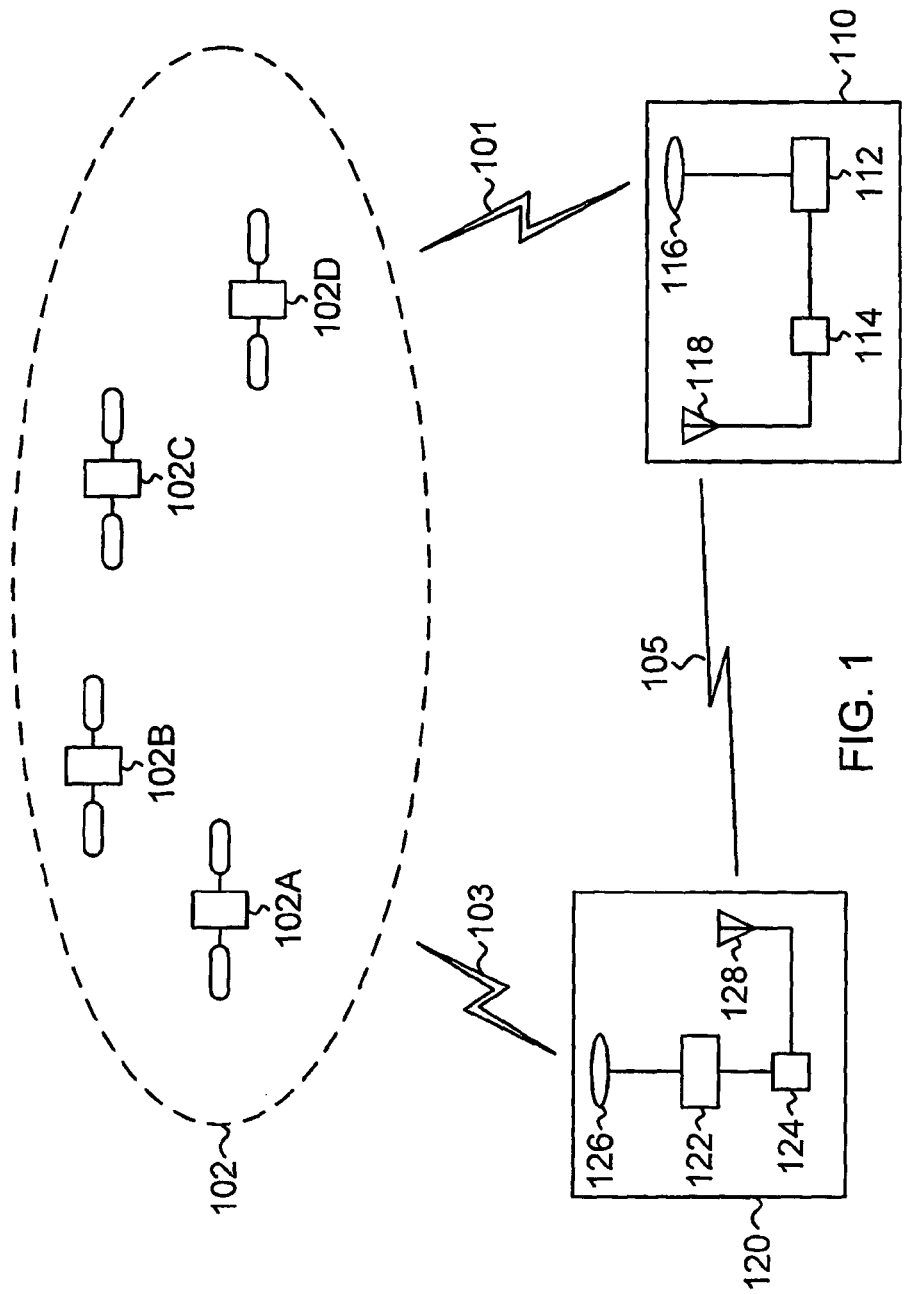
FIG. 1 shows a schematic of a basic differential navigation system.

FIG. 1 shows a schematic of a basic global navigation satellite system (GNSS) operating in a differential navigation (DN) mode; to simplify the terminology, this system is referred to as a DN system. The DN system includes a base station (also referred to simply as a base) 110, a rover 120, and a constellation 102 of navigation satellites. In general, the base 110 is fixed or stationary, and its coordinates are precisely known (for example, from precision surveying measurements). In general, the rover 120 is mobile.

The base 110 includes a navigation receiver 112 and an antenna 116 that receives satellite signals 101 from the constellation 102 of navigation satellites (shown are four representative navigation satellites, denoted navigation satellite 102A-navigation satellite 102D). Similarly, the rover 120 includes a navigation receiver 122 and an antenna 126 that receives satellite signals 103 from the constellation 102. Some navigation receivers can process signals from more than one GNSS (for example, both GPS and GLONASS).

The base 110 further includes a communications transceiver 114 and an antenna 118, and the rover further includes a communications transceiver 124 and an antenna 128. The base 110 and the rover 120 communicate (exchange data) via communication signals 105 that are transmitted and received by the transceiver 114 and the transceiver 124. In an embodiment, communication signals 105 are radiofrequency (RF) signals. Other communications signals, such as free-space optical signals, can be used. Note that FIG. 1 is a simplified high-level schematic; the base 110 and the rover 120 can include additional signal processors and computational units (not shown).

Note that the navigation receiver 122 and the communications transceiver 124 can be two separate units or a single integrated unit. Similarly, the navigation receiver 112 and the communications transceiver 114 can be two separate units or a single integrated unit.

The base 110 receives the satellite signals 101 and measures pseudo-ranges and carrier phases of the signals. The base 110 transmits correction information via the communications signals 105 to the rover 120. The rover 120 receives the satellite signals 103 and measures pseudo-ranges and carrier phases of the signals. If the distance between the base 110 and the rover 120 is sufficiently small, then most of the measurement errors at the base 110 and the rover 120 are correlated and compensated in co-processing. Since the exact coordinates of the base 110 are known, the rover 120 can calculate its own coordinates with a higher accuracy in the DN mode than in the stand-alone mode.

More complex DN systems are configured as network DN systems. In a network DN system, correction information for a rover is generated from measurements collected from a group of base stations that are geographically dispersed over a wide area. A network control center processes the measurements from a particular group of base stations and transmits the correction information to the rover.

Figure 2:
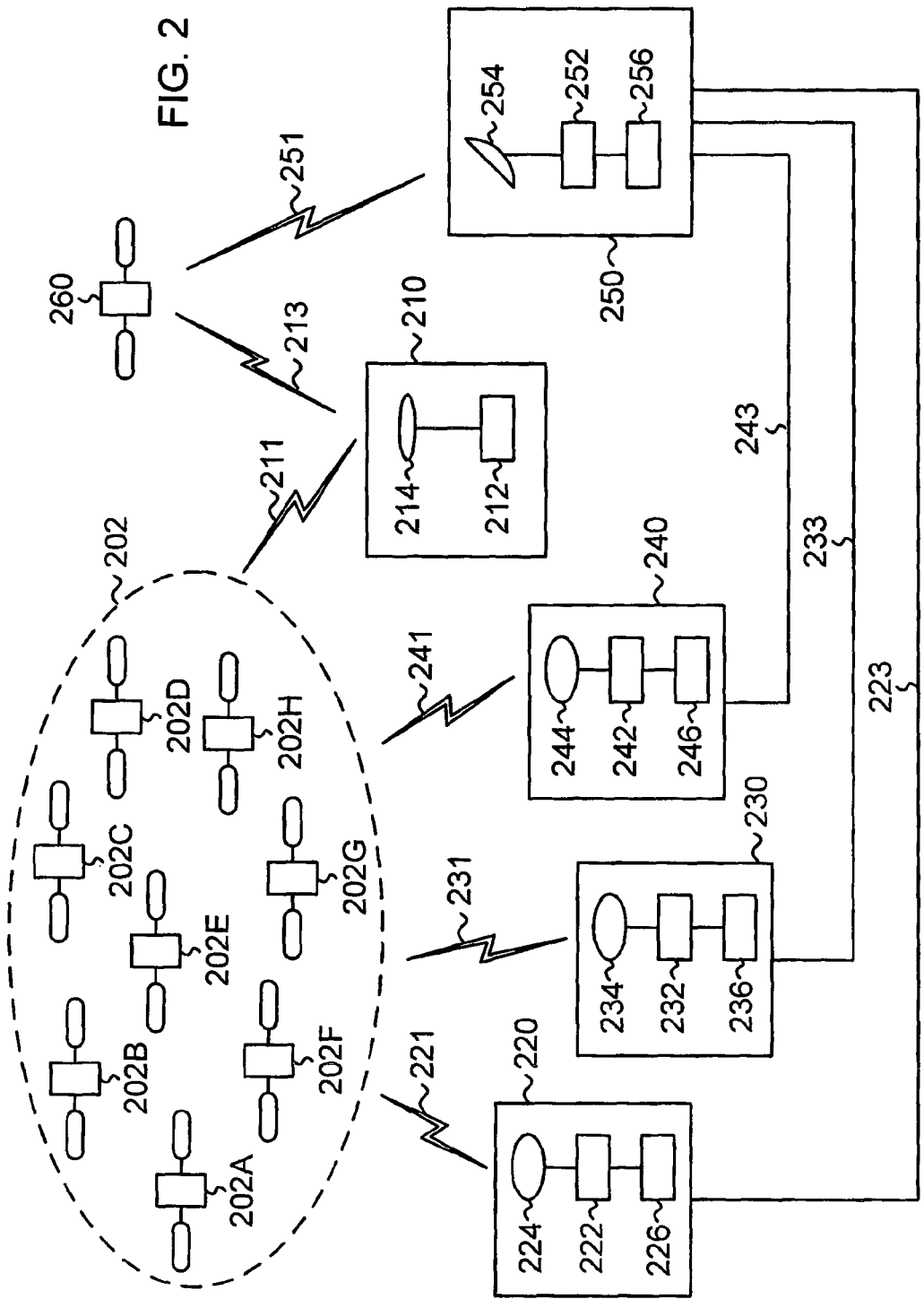
FIG. 2 shows a schematic of a network differential navigation system.

FIG. 2 shows an example of a network DN system. The network DN system includes a constellation 202 of navigation satellites; shown are eight representative navigation satellites, denoted navigation satellite 202A-navigation satellite 202H. The constellation 202 can include navigation satellites from more than one GNSS; for example, both GPS and GLONASS. A rover 210, with a navigation receiver 212 and an antenna 214, receives satellite signals 211 from the constellation 202.

The network DN system is a wide-area DN system with multiple geographically-dispersed base stations. Shown in FIG. 2 are three representative base stations, denoted base station 220, base station 230, and base station 240. The base station 220 includes a navigation receiver 222, an antenna 224, and a data processing and communications unit 226. Similarly, the base station 230 includes a navigation receiver 232, an antenna 234, and a data processing and communications unit 236; and the base station 240 includes a navigation receiver 242, an antenna 244, and a data processing and communications unit 246. The base station 220 receives satellite signals 221 from the constellation 202; the base station 230 receives satellite signals 231 from the constellation 202; and the base station 240 receives satellite signals 241 from the constellation 202. In general, each base station, and the rover 210, can receive satellite signals from a different subset of navigation satellites in the constellation 202 (dependent on the specific navigation satellites in view at each base station and rover).

The network DN system also includes a network control center that is linked with the base stations via communication links. To send correction information from the network control center to the rover, different communications channels can be used (for example, cellular radio channels and satellite channels).

Correction information can be partitioned into a few groups. The correction information can include:
  Results of code measurements from one of a group of base stations;
  Results of both code and phase measurements from one of a group of base stations;
  Orbital (trajectory) parameters of GNSS satellites and parameters of their clock offsets specified in the processing of measurements from a group of base stations;
  Results of code measurements for a virtual base station generated from processing the results of code measurements for a group of base stations;
  Results of code and phase measurements for a virtual base station generated from processing the results of code and phase measurements for a group of base stations.
Other correction information can be calculated and transmitted as well.

In the network DN system shown in FIG. 2, a satellite transmitter is used to communicate with the rover. The network control center (NCC) 250 includes a satellite transmitter 252, an antenna 254, and a data processing and communications unit 256. The base station 220 transmits its measurements to the NCC 250 via a communications link 223. Similarly, the base station 230 transmits its measurements to the NCC 250 via a communications link 233; and the base station 240 transmits its measurements to the NCC 250 via a communications link 243.

The NCC 250 receives the measurements from the base stations and processes the correction information according to specific algorithms to generate a consolidated set of correction information. The geosynchronous (geostationary) relay satellite 260 receives the consolidated set of correction information from the NCC 250 via satellite signals 251.

The geosynchronous relay satellite 260 retransmits the consolidated set of correction information over a specific region (zone) of the Earth. In FIG. 2, the rover 210 receives the consolidated set of correction information from the geosynchronous relay satellite 260 via satellite signals 213. The rover 210 then calculates its position from the information received via satellite signals 211 and the information received via the satellite signals 213. Note that the navigation receiver 212 in the rover 210 needs to be specially equipped to process the satellite signals 213.

Various network DN systems are available. One example of a network DN system is the commercial OmniSTAR DN system. OmniSTAR offers different grades of service at different subscription prices. The accuracy of calculating the coordinates of the rover depend on the grade of service. For the OmniSTAR-VBS service, a virtual base station is generated; the positioning accuracy of the rover is no worse than one meter. For the OmniSTAR-XP service, specified trajectory parameters of GNSS satellites and their clock offsets are transmitted; the positioning accuracy of the rover is no worse than a few decimeters. For the OmniSTAR-HP service, in addition to data transmitted in the OmniSTAR-XP service, code and phase measurements from all the base stations in the network are transmitted; the code and phase measurements are compensated for troposphere and ionosphere errors. For the OmniSTAR-HP service, the positioning accuracy of the rover is strongly dependent on the mutual configuration of the rover and base stations; the positioning accuracy is typically no worse than 10 centimeters.

When normal DN operation is disrupted, navigation receivers can switch to a different operational mode with lower accuracy. If a navigation receiver operating in the DGPS mode loses communication with the base station, for example, the navigation receiver can switch over to the stand-alone mode. Similarly, if the normal operation of a navigation receiver in a network DN system is disrupted, the navigation receiver, depending on the specific disruption, can switch over to a lower accuracy grade of service or to the stand-alone mode.

In response to external influences, a navigation receiver automatically switches between operational modes to reduce or minimize the negative impact of the external influences on positioning quality. In an embodiment of the invention, when external influences disrupt the normal operation of a navigation receiver, coordinate measurements are processed to improve the positioning quality (positioning quality is described in more detail below). External influences can cause large errors and can also change the statistical characteristics of the errors. Conditions that lead to disruption of normal operation depend on the DN mode.

For example, a navigation receiver that normally operates in the DGPS mode is capable of calculating coordinates with high accuracy during normal operation. When the navigation receiver loses communications with the base station, but continues to receive satellite signals from the navigation satellites, the navigation receiver can automatically switch over to the stand-alone mode. Coordinates continue to be calculated, although the accuracy is substantially reduced. Once the communications between the rover and the base station has been restored, the navigation receiver can automatically switch back from the stand-alone mode to the higher accuracy DGPS mode.

Communications can be lost as a result of signal loss between the navigation receiver and the base station; in addition, abnormally large noise or interference can cause loss of communications. Equipment failure at the rover or base station can also disrupt the normal DGPS operation.

A similar situation can arise for a navigation receiver operating in the network DN mode. In the OmniSTAR DN system, for example, when the navigation receiver loses communications with the OmniSTAR geostationary relay satellite, but continues to receive satellite signals from the navigation satellites, the navigation receiver can automatically switch over to the stand-alone mode. Communications can be lost as a result of signal loss between the navigation receiver and the OmniSTAR geostationary relay satellite. Abnormally large noise or interference can also cause loss of communications. Once the communications between the rover and the OmniSTAR geostationary relay satellite has been restored, the navigation receiver can automatically switch back from the stand-alone mode to the higher accuracy OmniSTAR mode.

Under specific disturbance conditions, a navigation receiver can automatically switch over from one OmniSTAR mode to another OmniSTAR mode; for example, a navigation receiver that normally operates in the OmniSTAR-HP mode can automatically switch over to the lower accuracy OmniSTAR-VBS mode (assuming that OmniSTAR-HP service is disrupted, but OmniSTAR-VBS service remains available). Once the disturbance condition has cleared, the navigation receiver can automatically switch back from the OmniSTAR-VBS mode to the higher accuracy OmniSTAR-HP mode.

Herein, a change in the algorithm for solving the positioning task in the navigation receiver in the rover is referred to as a "change in solution type". A change in solution type results in alteration of the statistical characteristics of the positioning errors. A fine solution type generates a solution with high accuracy; a rough solution type generates a solution with low accuracy. When a fine solution type is replaced by a rough solution type, the instantaneous positioning error can sharply increase. Similarly, when a rough solution type is replaced by a fine solution type, the instantaneous positioning error can sharply decrease. An abrupt change of the instantaneous positioning error can be interpreted by the user as an abrupt change in coordinates.

Multiple phenomena that disrupt the measurement process can occur and affect the total accuracy of a specific operation. When a navigation receiver is used in an automatic control system, under certain instances, the magnitude of the positioning error and changes in positioning errors can be dangerous. For example, abrupt changes (jumps or spikes) in the positioning error can result in shocks on the mechanical control elements. Control failure can result in breakage of mechanical units.

Herein, coordinates generated by the navigation receiver according to a particular positioning method (solution type) are referred to as primary estimates of coordinates. The quality of primary estimates of coordinates can be improved by smoothing with a narrowband complex filter within which dynamic errors are compensated by co-processing code and carrier phase observables. This method, however, has limitations. Slowly changing errors in low accuracy solutions are difficult to reduce only by smoothing, and any jump at the input of the narrowband filter will cause a reaction that increases the error for a long time.

The quality of estimating coordinates is characterized by two parameters: accuracy and smoothness. The term "accuracy" is well-known. Different estimation techniques are used to quantitatively characterize accuracy. Examples of parameters used to characterize accuracy include the following:

root mean square (RMS): square root of the average of the squares of instantaneous errors standard deviation: square root of the variance of the instantaneous error.

The root mean square refers to the accuracy of a particular positioning method (solution type). The standard deviation refers to the accuracy of coordinates generated by the navigation receiver for a particular solution type. Comparatively, "higher accuracy" refers to smaller numerical values of RMS or smaller numerical values of standard deviation.

Different estimation techniques are also used to quantitatively characterize "smoothness". Examples of parameters used to characterize smoothness include the following:

standard deviation: square root of the variance for a sequence of single or double differences of the instantaneous error probability that an increment of the instantaneous error over a time interval does not exceed a predetermined value.

For some applications, accuracy is more important than smoothness; in other applications, smoothness is more important than accuracy. In many applications, however, both accuracy and smoothness are important. In general, not every accurate estimate is smooth and not every smooth estimate is accurate; therefore, a proper balance between accuracy and smoothness appropriate for the application needs to be attained.

Some navigation receivers possess information about the solution type to which the generated primary estimates of coordinates correspond. The corresponding statistical accuracy for a specific solution type can only approximate the real accuracy of the primary estimates of coordinates. If the estimate of an a priori statistical accuracy for a specific solution type is calculated under one set of conditions, but the navigation receiver actually operates under a different set of conditions, then only the accuracy class, which can be represented by an accuracy rating (AR), can be characterized. Accuracy rating is described in more detail below.

Some navigation receivers generate, along with the primary estimates of coordinates, their current accuracy estimates. The accuracy estimates can vary over time, both when a particular solution type is maintained and when the solution type changes. These accuracy estimates are also approximate, but, for some cases, they characterize the accuracy of primary coordinates estimates better than a priori estimates.

In an embodiment, nonlinear recurrent filtration of the primary estimates of coordinates and the estimate of coordinate increments for one epoch is used, as well as an adaptive change in generating the estimates depending upon the information about the quality of primary estimates of coordinates at a given epoch. Measurements of primary estimates of coordinates are generated at discrete time instants, referred to as epochs. The time interval between two neighboring epochs is referred to as the epoch duration: $t_i = t_{i-1} + \Delta t$, where $t_i$ is the time instant of the current [i-th] epoch, $t_{i-1}$ is the time instant of the previous [(i−1)-th] epoch, and $\Delta t$ is the epoch duration.

A navigation receiver typically outputs data at intervals of 1 sec; in this case, the epoch duration=1 sec. In some instances, particularly in automatic control systems, the navigation receiver outputs data at shorter intervals; for example, 0.1 sec (epoch duration=0.1 sec) or 0.01 sec (epoch duration=0.01 sec).

Depending on the information about the quality of the primary estimates of coordinates, and the specific application, different embodiments can be used for processing the primary estimates of coordinates.

Figure 3A:
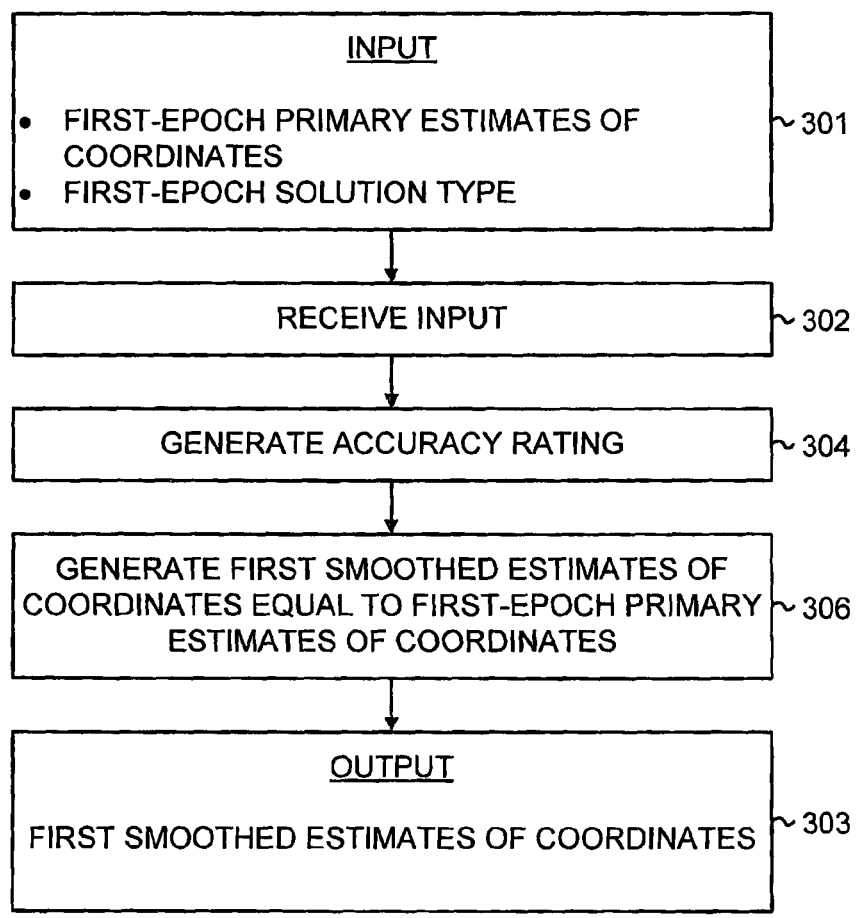
FIG. 3A-FIG. 3D show a flowchart of a first method for improving the positioning quality of coordinates estimates.
Figure 3B:
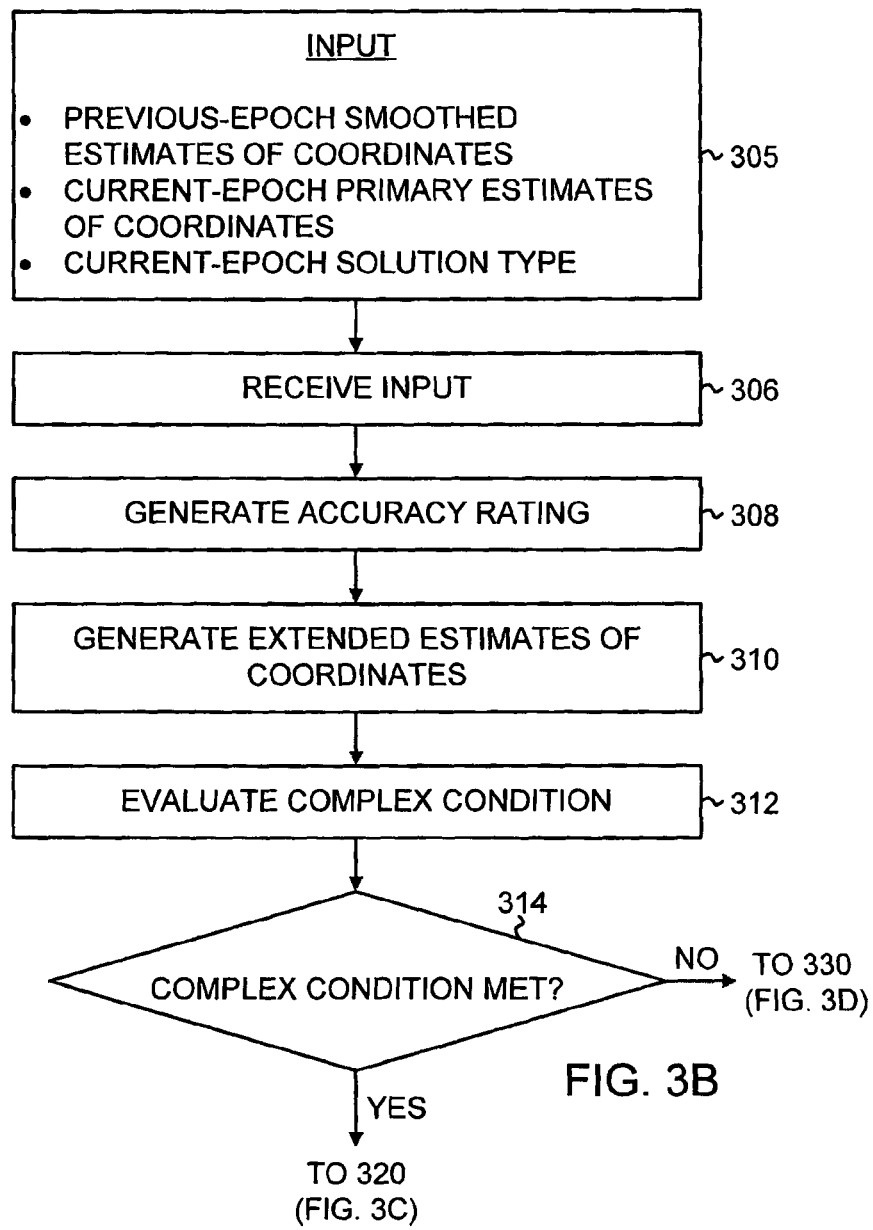
Figure 3C:
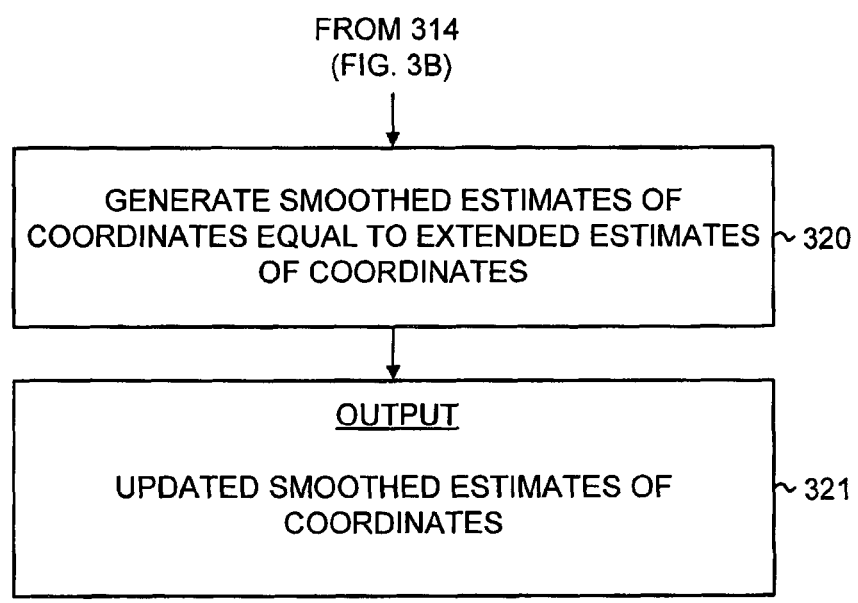

FIG. 3A-FIG. 3C show a flowchart of a method, according to an embodiment, for processing primary estimates of coordinates. In this embodiment, the information about the primary estimates of coordinates includes the solution type generated by the navigation receiver for each primary estimate of coordinates and the a priori known statistical accuracy for all solution types available for the specific navigation receiver. The solution types can be rank-ordered according to their statistical accuracy.

The rank-ordered solution types can be partitioned into groups. Each group is characterized by a group accuracy. For example, the group accuracy can be set equal to the accuracy of the most accurate solution type in the group. Note that "group accuracy" follows the same convention as "accuracy": comparatively, "higher group accuracy" refers to smaller numerical values of RMS or smaller numerical values of standard deviation. Different methods for partitioning the solution types can be used. In one method, the number of groups is equal to the number of solution types; that is, each group has only one member. In a second method, the number of groups is equal to two. The first group has one member, the solution type with the highest statistical accuracy. All the other solution types (that is, all the solution types with a statistical accuracy less than the highest statistical accuracy) are members of the second group.

For illustration, consider five solution types, rank-ordered from highest accuracy to lowest accuracy: solution type a, solution type b, solution type c, solution type d, and solution type e. In one group configuration, there are five groups: group A (solution type a) with group accuracy A, group B (solution type b) with group accuracy B, group C (solution type c) with group accuracy C, group D (solution type d) with group accuracy D, and group E (solution type e) with group accuracy E. In a second group configuration, there are two groups: group A (solution type a) with group accuracy A and group B (solution type b, solution type c, solution type d, and solution type e) with group accuracy B.

For purposes of the computational algorithms below, a group accuracy can be characterized by a numerical value of accuracy rating AR. In the convention used below, the numerical values of AR are integer values greater than or equal to 1. The smallest numerical value of AR (AR=1) corresponds to the highest group accuracy; a higher numerical value of AR (for example, AR=2) corresponds to a lower group accuracy. Other conventions can be used, for example, AR=1 can correspond to the lowest group accuracy, and AR=5 can correspond to the highest group accuracy. The algorithms below can be modified accordingly.

Refer to FIG. 3A. The process is initialized for the first epoch. In step 302, input 301 is received. Input 301 includes the first-epoch primary estimates of coordinates and the first-epoch solution type. The process then passes to step 304, in which a value of accuracy rating is generated for the first-epoch primary estimates of coordinates based on the first-epoch solution type. The process then passes to step 306, in which the first smoothed estimates of coordinates are generated by setting the first smoothed estimates of coordinates equal to the first primary estimates of coordinates. Output 303 of step 304 includes the first smoothed estimates of coordinates.

Figure 3D:
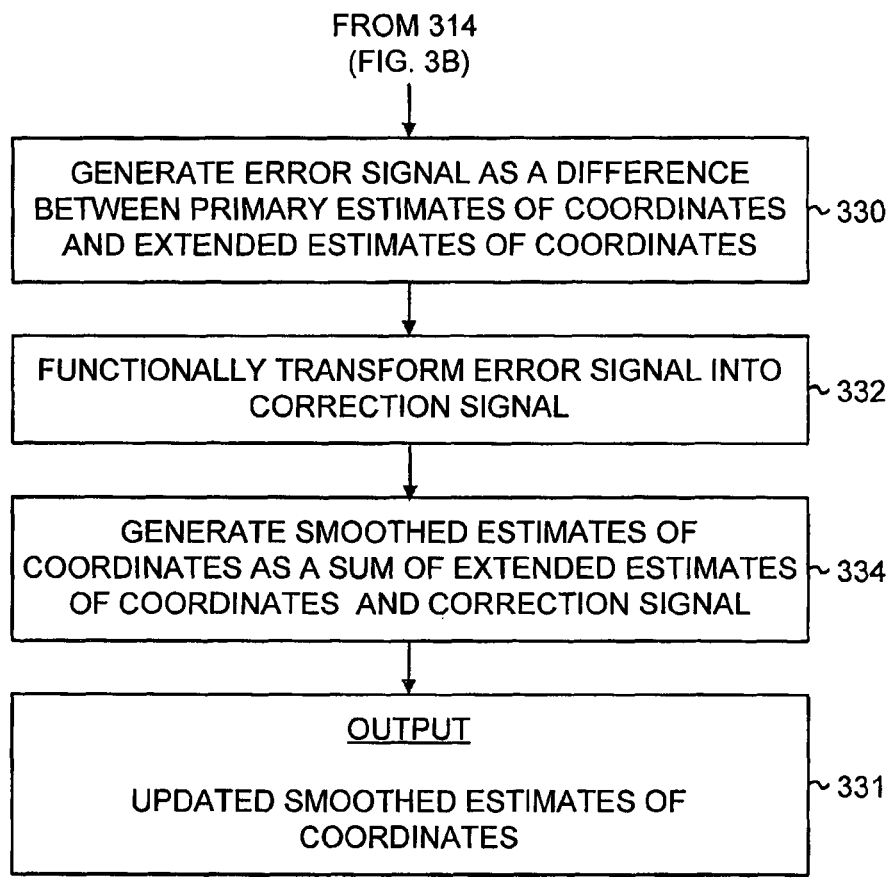

The steps shown in FIG. 3B-FIG. 3D are then iteratively performed for subsequent epochs.

Refer to FIG. 3B. In step 306, the input 305 is received. Input 305 includes:
  the previous-epoch smoothed estimates of coordinates [if the current epoch is the second epoch, then the previous-epoch smoothed estimates of coordinates correspond to output 303 (FIG. 3A)]
  the current-epoch primary estimates of coordinates
  the current-epoch solution type.

The process then passes to step 308, in which a value of accuracy rating is generated for the current-epoch primary estimates of coordinates based on the current-epoch solution type. The process then passes to step 310, in which extended estimates of coordinates are generated by adding the current-epoch coordinates increments to the previous-epoch smoothed estimates of coordinates. The current-epoch coordinates increments correspond to the changes in coordinates from the previous epoch to the current epoch calculated from carrier phase changes. More details of calculating the current-epoch coordinates increments are discussed below.

The process then passes to step 312, in which the following complex condition is evaluated:
  (a) When the AR value last changed, it changed from a lower value to a higher value (that is, the accuracy decreased); AND
  (b) The elapsed time from the time of the last AR value change to the present epoch does not exceed a predetermined maximum value (referred to as the extension interval).
If condition (a) and condition (b) are simultaneously met (satisfied), then the complex condition is met.

Herein, a "change epoch" refers to an epoch in which the accuracy rating at the epoch before the change epoch has a first value of accuracy rating, the accuracy rating at the change epoch has a second value of accuracy rating, and the first value of accuracy rating and the second value of accuracy rating are different. To simplify the terminology, herein, at a change epoch, the accuracy rating changes from a first value of accuracy rating to a second value of accuracy rating. The last change epoch, also referred to as the most recent change epoch, is the change epoch closest to the current epoch. If the value of the accuracy rating at the epoch before the current epoch is different from the value of the accuracy rating at the current epoch, then the last change epoch is the current epoch.

The process then passes to the decision step 314. If the complex condition is met, then the process passes to step 320 (FIG. 3C), in which smoothed estimates of coordinates are generated by setting the smoothed estimates of coordinates to the extended estimates of coordinates previously generated in step 310 (FIG. 3B). The output 321 of step 320 includes the updated smoothed estimates of coordinates. Output 321 is fed back as part of input 305 (FIG. 3B) for the next iteration.

Refer back to step 314 (FIG. 3B). If the complex condition is not met, then the process passes to step 330 (FIG. 3D), in which an error signal is generated as a difference between the current-epoch primary estimates of coordinates and the extended estimates of coordinates previously generated in step 310 (FIG. 3B). The process then passes to step 332, in which the error signal is functionally transformed into a correction signal. There are many variants of functional transformations; some examples are described below. Note that a nonlinear functional transformation (unlike a proportional transformation) can reduce sharp changes in primary estimates of coordinates caused by both abnormal errors and changes in solution types.

The process then passes to step 334, in which smoothed estimates of coordinates at the current epoch are generated by adding the correction signal to the extended estimates of coordinates previously generated in step 310 (FIG. 3B). The output 331 of step 334 includes the updated smoothed estimates of coordinates. Output 331 is fed back as part of input 305 (FIG. 3B) for the next iteration.

The process qualitatively described above with reference to the flowchart in FIG. 3A-FIG. 3D can be expressed in formal mathematical terms as follows.

First define the following variables:
i is the index of the current epoch
i−1 is the index of the previous epoch
X is the primary estimates of coordinates, expressed in meters, representing each of the Cartesian coordinates (x, y, z) with respect to a user-defined reference frame (such as geocentric or local)
ΔX is the coordinates increments (changes in coordinates from the previous epoch to the current epoch), obtained from carrier phase measurements
$X^{SMOOTH}$ is the smoothed estimates of coordinates, resulting from performing a smoothing operation on the primary estimates of coordinates
$X^{PROG}$ is the extended estimates of coordinates
δ is the error signal
Δ is the correction signal.

Methods for calculating ΔX (the coordinates increments) are described in U.S. Pat. Nos. 7,522,099, 7,439,908, and 7,710,316, which are incorporated by reference herein. Note: The methods described in the cited references for calculating ΔX can be performed by navigation receivers (including many DGPS receivers) that process carrier phase measurements along with code measurements.

Then, $$X_{(i)}^{PROG} = X_{(i-1)}^{SMOOTH} + \Delta X_{(i)} \quad (E1)$$

$$\delta_{(i)} = X_{(i)} - X_{(i)}^{PROG} \quad (E2)$$

$$\Delta_{(i)} = \Phi[\delta_{(i)}] \quad (E3)$$

$$X_{(i)}^{SMOOTH} = \begin{cases} X_{(i)}^{PROG} + \Delta_{(i)} & \text{if} \langle P_{(i)} = \text{"ON"} \rangle \\ X_{(i)}^{PROG} & \text{if} \langle P_{(i)} = \text{"OFF"} \rangle \end{cases}. \quad (E4)$$

In (E3), $\Delta_{(i)}=\Phi[\delta_{(i)}]$ represents a general functional transformation. Examples of specific functional transformations are discussed below.

In (E4), $P_{(i)}$ is determined by the following expression:

$$P_{(i)} = \begin{cases} \text{"OFF"} & \text{if} \langle B = \text{truth} \rangle \\ \text{"ON"} & \text{if} \langle B = \text{false} \rangle \end{cases}. \quad (E5)$$

B is the logical (Boolean) variable defined from (E6) below:

$B = [AR_{(i)} > AR_{(i-1)}]$ OR $[(AR_{(i)} = AR_{(i-1)})$ AND $(P_{(i-1)} = \text{"OFF"})$ AND $(t_{(i)} < T^{PROG})]. \quad (E6)$ In (E6), $AR_{(i)}$ is the value of accuracy rating for primary estimates of coordinates for the current epoch; and $AR_{(i-1)}$ is the value of accuracy rating for primary estimates of coordinates at the previous epoch. The condition $AR_{(i)} > AR_{(i-1)}$ means that the value of accuracy rating of the primary estimates of coordinates for the current epoch became larger than the value of accuracy rating of the primary estimates of coordinates at the previous epoch; that is, the accuracy of the solution type at the current epoch decreased.

$T^{PROG}$ is the extension interval; that is, the maximum time interval over which the extended estimates of coordinates can be used to smooth the primary estimates of coordinates. $t_{(i)}$ is the time interval elapsed from the instant of the last change in the value of accuracy rating of the primary estimates of coordinates:

$$t_{(i)} = \begin{cases} t_{(i-1)} + \Delta t & \text{if} \langle AR_{(i)} = AR_{(i-1)} \rangle \\ 0 & \text{if} \langle AR_{(i)} \neq AR_{(i-1)} \rangle \end{cases}, \quad (E7)$$

where Δt is the epoch duration (time interval between consecutive epochs).

For P="ON", (E1)-(E7) describe a closed nonlinear circuit that smooths primary estimates of coordinates used in calculating coordinate increments. For P="OFF", the circuit is open, and smoothed estimates of coordinates are determined by the current values of the extended estimates of coordinates.

Users are interested in obtaining accurate coordinates. The most accurate primary estimates of coordinates are smoothed. The least accurate primary estimates of coordinates are replaced by extended estimates of coordinates. To solve this task, a Boolean variable is needed, as in (E6). Extended estimates of coordinates tend to slowly lose accuracy over time. This phenomenon, referred to as error drift, limits the use of extended estimates of coordinates to a maximum time interval $T^{PROG}$.

Different embodiments of the functional transformation (E3) can be used. One example is a simple linear transformation:

$$\Delta[\delta_{(i)}] = K \cdot \delta_{(i)}, \quad (E8)$$

where the coefficient K plays the role of the transfer gain of the filter and defines its filtering characteristics.

In another embodiment, nonlinearities that limit the correction signal (Δ) in the case of sufficiently large error signals (δ) are used for functional transformation. One example of such a functional transformation is the linear-polygonal transformation:

$$\Delta_{(i)}[\delta_{(i)}, K_1, \delta_{h1}, U_1] = \begin{cases} K_1 \cdot \delta_{(i)} & \text{if} \langle |\delta_{(i)}| \leq \delta_{h1} \rangle \\ U_1 \cdot \text{sign}(\delta_{(i)}) & \text{if} \langle |\delta_{(i)}| > \delta_{h1} \rangle \end{cases} \quad (E9)$$

or

-continued $$\Delta_{(i)}[\delta_{(i)}, K_2, \delta_{h2}, U_2] = \begin{cases} K_2 \cdot \delta_{(i)} & \text{if} \langle |\delta_{(i)}| \le \delta_{h2} \rangle \\ U_2 \cdot K_2 \cdot \text{sign}(\delta_{(i)}) & \text{if} \langle |\delta_{(i)}| > \delta_{h2} \rangle \end{cases}. \quad (E10)$$

Another example of such a functional transformation is the nonlinear transformation given by:

$$\Delta_{(i)}[\delta_{(i)}, K_3, \delta_{h3}, n] = \frac{K_3 \cdot (\delta_{h3})^n \cdot \delta_{(i)}}{(\delta_{h3})^n + |\delta_{(i)}|^n}. \quad (E11)$$

In the equations above, $$\text{sign}[\delta_{(i)}] = \begin{cases} 1 & \text{if} \langle \delta_{(i)} > 0 \rangle \\ 0 & \text{if} \langle \delta_{(i)} = 0 \rangle, \\ -1 & \text{if} \langle \delta_{(i)} < 0 \rangle \end{cases} \quad (E12)$$

and the symbol | . . . | means the modulus (absolute magnitude or value) of the number.

The values ($K_1$, $\delta_{h1}$, $U_1$), ($K_2$, $\delta_{h2}$, $U_2$) and ($K_3$, $\delta_{h3}$, n) are referred to herein as the parameters of the corresponding functional transformation. When these parameters are changed, the shape of the nonlinearity applied to the closed loop significantly affects the properties of the loop, and, hence, the smoothing characteristics. The parameters ($K_1$, $K_2$, $K_3$) are often referred to as the transfer gain, similar to the transfer gain in a linear closed circuit in which the transfer gain determines the equivalent smoothing bandwidth. The parameters ($\delta_{h1}$, $\delta_{h2}$, $\delta_{h3}$) are referred to herein as the limit threshold. These parameters differentiate the value of the error signal as large or small. The parameters ($U_1$, $U_2$) can be regarded as the limit level. They determine the correction signal value for the instances when the error signal is greater than the limit threshold. The parameter n is a power (exponent); n is not limited to integer values. Examples of values for the various parameters are given below.

Different embodiments of smoothing methods use different functional transformations, different rules for setting values of parameters, and different methods for classifying solution types. Two examples of methods for classifying solution types are:
  (I) The number of accuracy ratings is equal to the number of available solution types. The value of accuracy rating varies inversely with the accuracy of the solution type: the smallest value of the accuracy rating corresponds to the highest accuracy solution type, the largest value of the accuracy rating corresponds to the lowest accuracy solution type.
  (II) The number of accuracy ratings is equal to two. The most accurate solution type is assigned the lower value of the accuracy rating. All the other (lower accuracy) solution types are assigned the same higher value of the accuracy rating.

Table 1 (FIG. 4) lists several combinations of different classification methods, types of functional transformation, and rules for setting functional transformation parameters. These combinations as a whole (variants) define specific features for building an adaptive nonlinear complex filter and can be used for different applications. Column 402 specifies the variant. Column 404 specifies the classification method [(I) or (II), as described above]. Column 406 specifies the nonlinearity type [according to the equations E(9), (E10), or (E11) described above]. Column 408 specifies the rules for setting the functional transformation parameters.

In Variant 1, the transfer gain and the limit threshold depend on the value of accuracy rating (AR) of the current primary estimates of coordinates. The values of the transfer gain and the limit threshold are chosen from statistical characteristics for all available values of AR. The limit level is variable and is assigned according to the desired ratio of smoothness and accuracy for the smoothed estimates of coordinates.

In Variant 2, the transfer gain and the limit threshold do not depend on the value of accuracy rating. Their values are selected based on statistical characteristics of the most accurate solution type only. In this case, the desired ratio of smoothness and accuracy for the smoothed estimates of coordinates is determined by the value of the power n.

In Variant 3, the transfer gain is variable and depends on the time elapsed since the time at which the last change in AR occurred. The limit threshold and the limit level are constants.

In column 408 of Table 1, the following notation is used. The value VAR means that the numerical value of the parameter can be selected by the user for the desired balance of accuracy and smoothness for a particular application (such as machine control, surveying, or mapping). The value CONST means that the numerical value of the parameter is set based on the solution type with the highest accuracy for a particular navigation receiver; the numerical value does not change when the solution type changes.

In most inertial systems, to reduce the error when the system is first turned on, special procedures should be taken to reduce the interval required to attain the steady-state mode. Herein, the instant at which the system is first turned on is referred to as the turn-on time. A commonly used method is to gradually reduce the transfer gain during the initial period after the turn-on time. In one embodiment, the dependence of the transfer gain on time can be expressed as:

$$K = \begin{cases} \frac{1}{i} & \text{if} \left( \frac{1}{i} > K_{lim} \right) \\ K_{lim} & \text{if} \left( \frac{1}{i} \le K_{lim} \right) \end{cases}, \quad (E13)$$

where:
  K refers to any one of $K_1$ and $K_3$;
  i is the index of the current epoch calculated from the turn-on time (this instant is assigned the value i=1); and
  $K_{lim}$ is the limiting value of the transfer gain.
Note: In (E13), the time interval during which the transfer gain reduces depends on the epoch duration.

For Variant 1, the value of $K_{1,lim}$ depends on the current value of AR: $K_{1,lim}=K_{1,lim}[AR_{(i)}]$. For Variant 2, $K_{3,lim}$ depends only on the lowest value of AR, and does not change with time: $K_{3,lim}$=CONST. Examples of values of the functional transformation parameters for Variant 1 are given in Table 3; examples of values of the functional transformation parameters for Variant 2 are given in Table 5. Further details are given below.

In addition to the method described by (E13), there are other methods for reducing errors during the interval after the system has been turned on. For example, in an embodiment of Variant 3, the dependence of the transfer gain on time, $K_2$ (t), is set separately over different time intervals. The first time interval starts at the instant of turn-on and ends at the instant that the AR value first changes. For subsequent time intervals, the start and end times are set by instants when the AR value changes. The time is reset to zero at the start of each time interval. In this case, the time interval over which the transfer gain is initially reduced from the value at the turn-on time does not depend on the epoch duration; the duration of the time interval is a user-specified number of seconds. Examples of values of $K_2$ (t) are given in Table 7B. Further details are given below.

Examples describing specific applications are given below.

EXAMPLE 1

This example illustrates Variant 1 of building the adaptive nonlinear filter (see Table 1 in FIG. 4), when the receiver operates in the OmniSTAR mode and classification method (I) is used. Table 2 (FIG. 5) lists the available solution types (column 502) and the assigned AR values (column 504).

According to logic expressions (E5) and (E6), with classification method (I), at time intervals when AR=3, the smoothed estimates of coordinates are generated as extended estimates of coordinates. At time intervals when AR=1, the smoothed estimates of coordinates are generated by the closed loop. At time intervals when AR=2, the smoothed estimates of coordinates are generated either by the closed loop or as extended estimates of coordinates, depending on the previous AR value. Table 3 (FIG. 6) gives examples of values for the parameters of the functional transformation, if nonlinearity (E9) is used in the closed loop. Column 602 lists the parameters of the functional transformation. Column 604 gives the values for AR=1; and column 606 gives the values for AR=2.

This example demonstrates that Variant 1 of the adaptive nonlinear filter allows nonlinearity parameters to be assigned to each solution type. The adaptive nonlinear filter substantially improves the accuracy and smoothness of the coordinate estimates under harsh environmental conditions.

EXAMPLE 2

This example illustrates Variant 2 of building the adaptive nonlinear filter (see Table 1 in FIG. 4), when the receiver operates in the OmniSTAR mode and classification method (II) is used. Table 4 (FIG. 7) lists the available solution types (column 702) and the assigned AR values (column 704).

Figure 8:
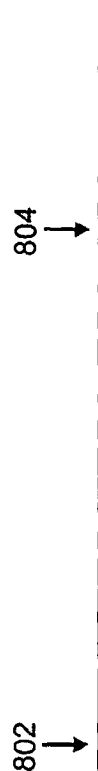
FIG. 8 shows Table 5, which lists values of parameters of a particular functional transformation for an example of Variant 2.

According to logic expressions (E5) and (E6), with classification method (II), the smoothing loop will be closed only over time intervals when AR=1; for the other time intervals, extended estimates of coordinates are used as smoothed estimates of coordinates. Table 5 (FIG. 8) gives examples of values for the parameters of the functional transformation, if nonlinearity (E11) is used in the closed loop. Column 802 lists the parameters of the functional transformation. Column 804 gives the values for AR=1.

This example shows that Variant 2 of the adaptive nonlinear filter improves the accuracy and smoothness of estimates of coordinates under harsh operational environments by selecting nonlinear parameters for only one solution type (the most accurate solution type). For the other (less accurate) solution types, extended estimates of coordinates are used for smoothed estimates of coordinates.

EXAMPLE 3

This example illustrates Variant 3 of building the adaptive nonlinear filter (see Table 1 in FIG. 4), when the receiver operates in one of two different modes (OmniSTAR and DGPS) and classification method (II) is used. Table 6 (FIG. 9) lists the available modes (column 902), the available solution types (column 904), and the assigned AR values (column 906).

Figure 10A:

According to logic expressions (E5) and (E6), with classification method (II), the smoothing loop is closed over time intervals when the solution types belong to the first accuracy rating (AR=1); for AR=2, extended estimates of coordinates are generated and used for the smoothed estimates of coordinates. Table 7A (FIG. 10) gives examples of values for the parameters of the functional transformation, if nonlinearity (E10) is used in the closed loop. Column 1002 lists two parameters, the limit threshold and the limit level. Column 1004 gives the values for AR=1.

Table 7B (FIG. 10B) gives examples of values for the transfer gain, $K_2$. The values are time dependent. Column 1006 lists the time interval (first time interval or subsequent time intervals, as discussed above); column 1008 lists the time ranges (in seconds, as discussed above); and column 1010 lists the values of the transfer gain. These values are independent of the mode and solution type.

This example shows that Variant 3 of building the adaptive nonlinear filter allows the same nonlinear parameters to be used for different operation modes, while maintaining a substantial improvement in accuracy and smoothness of estimates of coordinates when solution types are changed under harsh environments.

In the methods described above, the navigation receiver generates primary estimates of coordinates and supplies information regarding the solution type. Some navigation receivers, however, do not supply information regarding the solution type. Instead, the navigation receiver generates primary estimates of coordinates and supplies information regarding the accuracy estimate of the primary estimates of coordinates. Further details of accuracy estimates are given below.

Figure 11A:
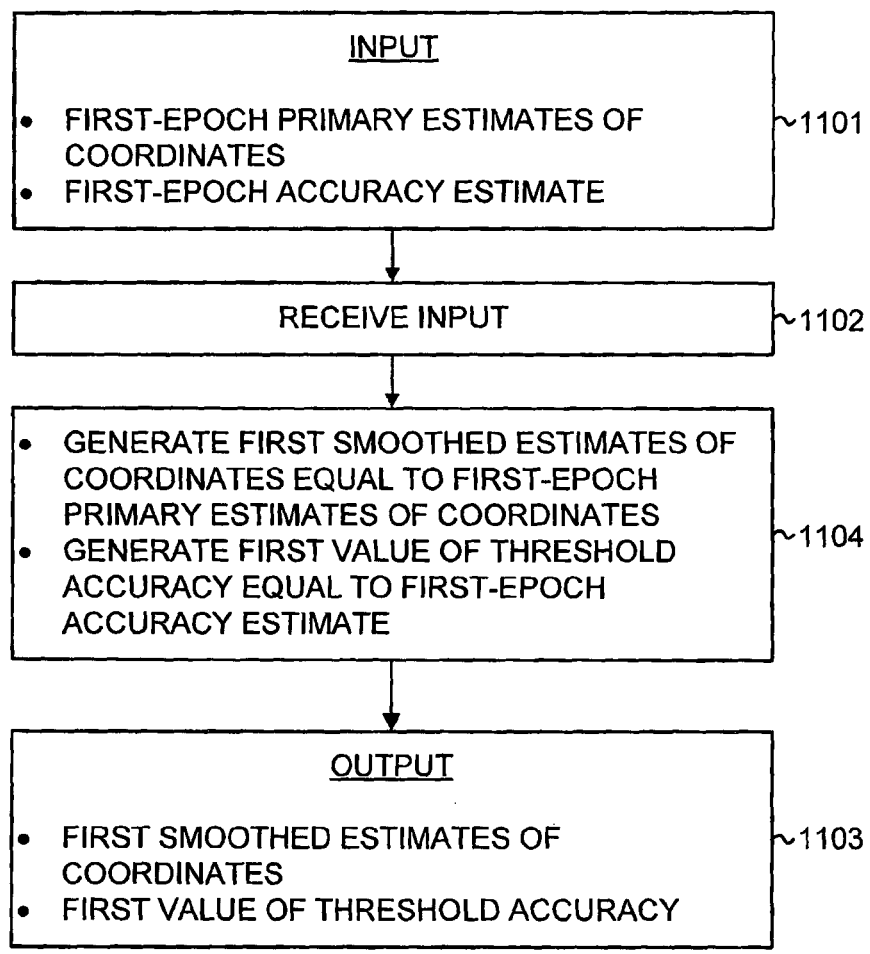
FIG. 11A-FIG. 11D show a flowchart of a second method for improving the positioning quality of coordinates estimates.

FIG. 11A-FIG. 11D show a flowchart of a method, according to an embodiment, for processing estimates of coordinates for this category of navigation receivers. Refer to FIG. 11A. The process is initialized for the first epoch. In step 1102, input 1101 is received. Input 1101 includes the first-epoch primary estimates of coordinates and the first-epoch accuracy estimate. The process then passes to step 1104, in which the first smoothed estimates of coordinates are generated by setting the first smoothed estimates of coordinates equal to the first-epoch primary estimates of coordinates, and the first value of threshold accuracy is generated by setting the first value of threshold accuracy equal to the first-epoch accuracy estimate. Output 1103 of step 1104 includes the first smoothed estimates of coordinates and the first value of threshold accuracy.

Figure 11B:
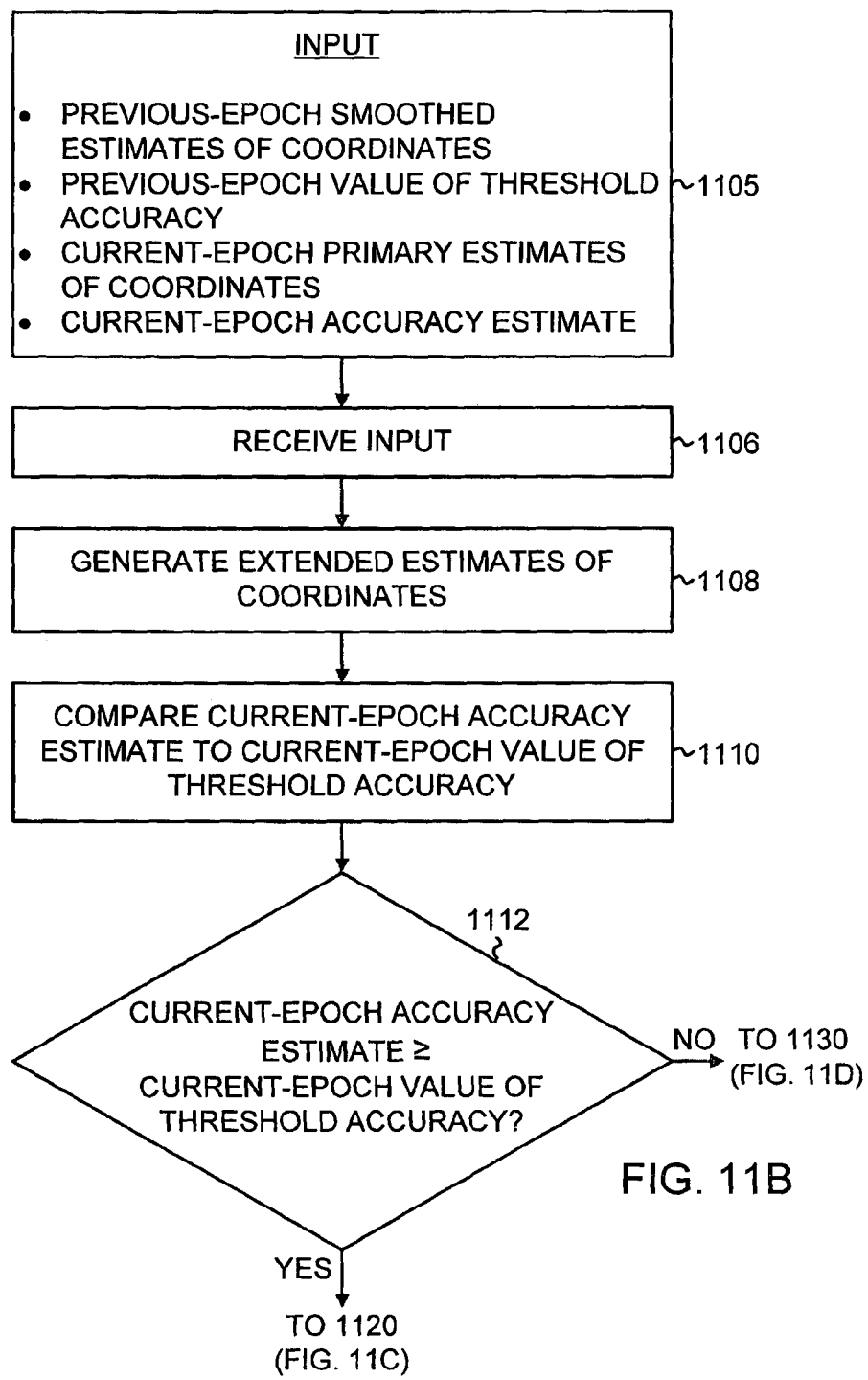
Figure 11C:
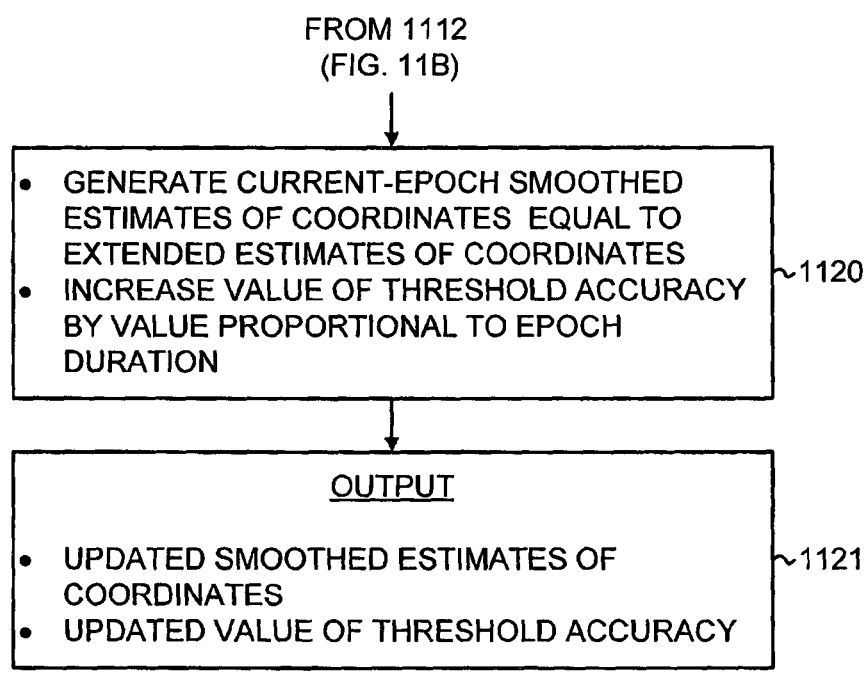
Figure 11D:
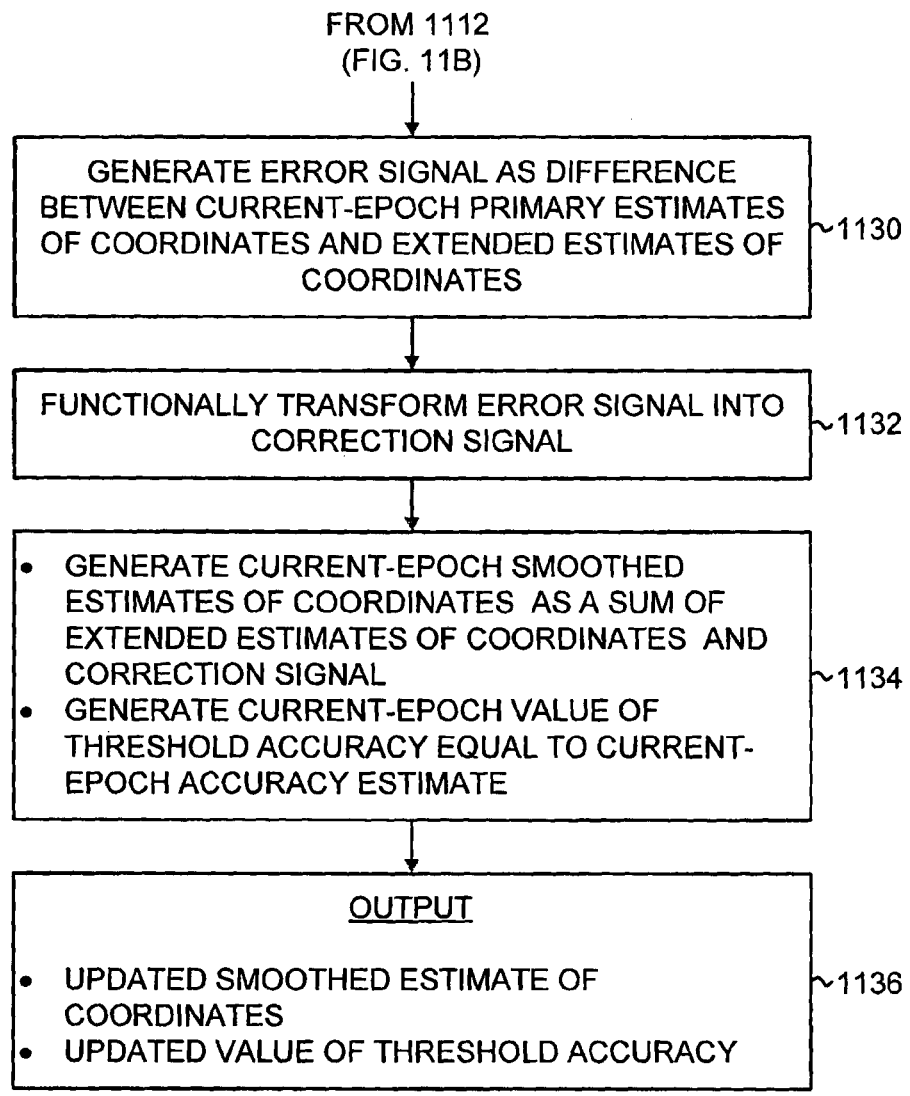

The steps shown in FIG. 11B-FIG. 11D are then iteratively performed for subsequent epochs.

Refer to FIG. 11B. In step 1106, the input 1105 is received. Input 1105 includes:
- the previous-epoch smoothed estimates of coordinates [if the current epoch is the second epoch, then the previous-epoch smoothed estimates of coordinates correspond to those in output 1103 (FIG. 11A)]
- the previous-epoch value of threshold accuracy [if the current epoch is the second epoch, then the previous-epoch value of threshold accuracy corresponds to that in output 1103 (FIG. 11A)]
- the current-epoch primary estimates of coordinates
- the current-epoch accuracy estimate.

The process then passes to step 1108, in which extended estimates of coordinates are generated by adding the current-epoch coordinates increments to the smoothed estimates of coordinates at the previous epoch.

The process then passes to step 1110, in which the current-epoch accuracy estimate is compared to the current-epoch value of threshold accuracy. The process then passes to decision step 1112. If the current-epoch accuracy estimate is greater than or equal to the current-epoch value of threshold accuracy, then the process passes to step 1120 (FIG. 11C), in which the smoothed estimates of coordinates estimates are generated by setting the smoothed estimates of coordinates equal to the extended estimates of coordinates previously generated in step 1108 (FIG. 11B), and the value of the threshold accuracy is increased by a value proportional to the epoch duration (more details are provided below). The output 1121 of step 1120 includes the updated smoothed estimates of coordinates and the updated value of threshold accuracy. Output 1121 is fed back as part of input 1105 (FIG. 11B) for the next iteration.

Refer back to step 1112 in FIG. 11B. If the current accuracy estimate is smaller than the current value of threshold accuracy, then the process passes to step 1130 (FIG. 11D), in which an error signal is generated at the current epoch as a difference between the current-epoch primary estimates of coordinates and the extended estimates of coordinates previously generated in step 1108 (FIG. 11B). The process then passes to step 1132, in which the error signal is functionally transformed into a correction signal.

The process then passes to step 1134, in which smoothed estimates of coordinates at the current epoch are generated by adding the correction signal to the extended estimates of coordinates. The value of the threshold accuracy is set equal to the current-epoch accuracy estimate. The output 1131 of step 1134 includes the updated smoothed estimates of coordinates and the updated value of threshold accuracy. Output 1131 is fed back as part of input 1105 (FIG. 11B) for the next iteration.

The current value of the accuracy estimate can be generated in two different ways. In one case, the current value of the accuracy estimate is set equal to the estimate of the accuracy obtained from preliminary statistical tests of the navigation receiver in each of the available operational modes. When an operational mode is changed, the current value of the accuracy estimate is correspondingly changed. In this case, the corresponding RMS value can be used as the accuracy estimate.

In the other case, the current value of the accuracy estimate is generated in solving the positioning task and takes into account the navigation receiver characteristics, the applied processing method, changes in GNSS satellite configuration during operation, and changes in operational modes due to any cause. The accuracy characteristic of the navigation receiver can be represented as a correlation matrix $$R = \begin{Vmatrix} D_{XX} & D_{XY} & D_{XZ} \\ D_{XY} & D_{YY} & D_{YZ} \\ D_{XZ} & D_{YZ} & D_{ZZ} \end{Vmatrix},$$

the diagonal elements of which correspond to estimates of the error variance for the corresponding coordinates. In this case, the standard deviations $\sigma_{XX(i)} = \sqrt{D_{XX(i)}}$, $\sigma_{YY(i)} = \sqrt{D_{YY(i)}}$, and $\sigma_{ZZ(i)} = \sqrt{D_{ZZ(i)}}$ are regarded as accuracy estimates for each primary estimates of coordinates.

In some cases, the difference between variances of different coordinates is negligible and a common coordinate accuracy estimate, referred to as the dimensional accuracy estimate, can be applied for all coordinates to characterize accuracy estimate. For the three-dimensional (3-D) coordinate system (x, y, z), the dimensional accuracy estimate is determined as $\sigma_{3D(i)} = \sqrt{D_{XX(i)} + D_{YY(i)} + D_{ZZ(i)}}$; and for the two-dimensional (2-D) coordinate system (x, y), it is determined as $\sigma_{2D(i)} = \sqrt{D_{XX(i)} + D_{YY(i)}}$. In the discussions herein, the current value of the accuracy estimate $\sigma_{(i)}$ refers to any of the above-described embodiments of accuracy estimate.

The adaptive processing rule includes two main steps: (1) nonlinear filtering of more accurate primary estimates of coordinates and using extended estimates of coordinates when the accuracy drops, and (2) changing parameters of the functional transformation when the accuracy estimate $\sigma_{(i)}$ changes.

To implement this rule, a value of threshold accuracy $\sigma_{H(i)}$ is generated at each epoch in accordance with a recurrent expression. The value of threshold accuracy at the first epoch is assumed to be equal to the accuracy estimate of the first primary estimates of coordinates, $\sigma_{H(i=1)} = \sigma_{(i=1)}$. The following is then calculated:

$$\sigma_{H(i)} = \begin{cases} \sigma_{(i)} & \text{if} \langle \sigma_{(i)} < \sigma_{(i-1)} \rangle \\ (\sigma_{H(i-1)} + \Delta t \cdot V_D) & \text{if} \langle \sigma_{(i)} \geq \sigma_{(i-1)} \rangle \end{cases}, \quad (E14)$$

where $\Delta t$ is the epoch duration, and $V_D$ is the average degradation rate of the extended estimates of coordinates.

The numeric value of the average degradation rate for the extended estimates of coordinates $V_D$ can be determined in preliminary statistical tests of the navigation receiver. For high-grade navigation receivers, $V_D$ does not normally exceed approximately $(1.5\text{-}2.0) \cdot 10^{-4}$ m/s.

If the value of the threshold accuracy is formed in accordance with this rule, the above-mentioned logic (Boolean) variable (E6) is generated according to $$B = (\sigma_{(i)} \geq \sigma_{H(i)}). \quad (E15)$$

Following (E5) and (E4), more accurate primary estimates of coordinates are smoothed, and less accurate primary estimates of coordinates are replaced by extended estimates of coordinates.

The nonlinear functions (E9) and (E11) can be used as functional transformations. But now their parameters (the transfer gain and the limit threshold) at each epoch will be changed depending upon the current value of the accuracy estimate according to $$\delta_{h1(i)} = k \cdot \sigma_{(i)}; \; \delta_{h3(i)} = k \cdot \sigma_{(i)} \quad (E16)$$

$$K_{1(i)} = \frac{M}{\sigma_{(i)}^2}; \; K_{3(i)} = \frac{M}{\sigma_{(i)}^2}. \quad (E17)$$

In an embodiment, values of coefficients in (E16) and (E17) can be selected from a range of k equal to approximately 2-4 and a range of M equal to approximately $(3\text{-}9) \cdot 10^{-4}$ m²/s. The limit level $U_1$ and the power n, as before, determine the desired ratio of smoothness and accuracy for the smoothed estimates of coordinates. Choosing these values from the range of $U_1$ equal to approximately $(0.01\text{-}0.0003)$ m/s and the range of n equal to approximately (1-3) can yield acceptable results for a wide range of navigation receiver applications. Note, as discussed above, the power n is not limited to integer values.

If the functional transformation corresponds to (E10), the corresponding parameters $\delta_{h2}$ and $U_2$ can be fixed, and the parameter $K_{2(i)}$ can be changed to $K_{2(i)}=K_2[t_{(i)}]$, depending on the duration of the time interval $t_{(i)}$ over which the primary estimates of coordinates are smoothed. As soon as the extended estimates of coordinates are used as smoothed estimates of coordinates, the counter of smoothing duration will be reset, $t_{(i)}=0$. Table 7A (FIG. 10A) gives an example of values of the parameters $\delta_{h2}$ and $U_2$. Column 1002 lists the parameters of the functional transformation, and column 1004 lists their values. Table 7B (FIG. 10B) gives values of $K_{2(i)}=K_2[t_{(i)}]$ which yield a noticeable improvement in accuracy and smoothness irrespective of the current accuracy of primary estimates of coordinates. Column 1006 lists the time interval; column 1008 lists the time; and column 1010 lists the values of $K_{2(i)}=K_2[t_{(i)}]$.

Figure 12:
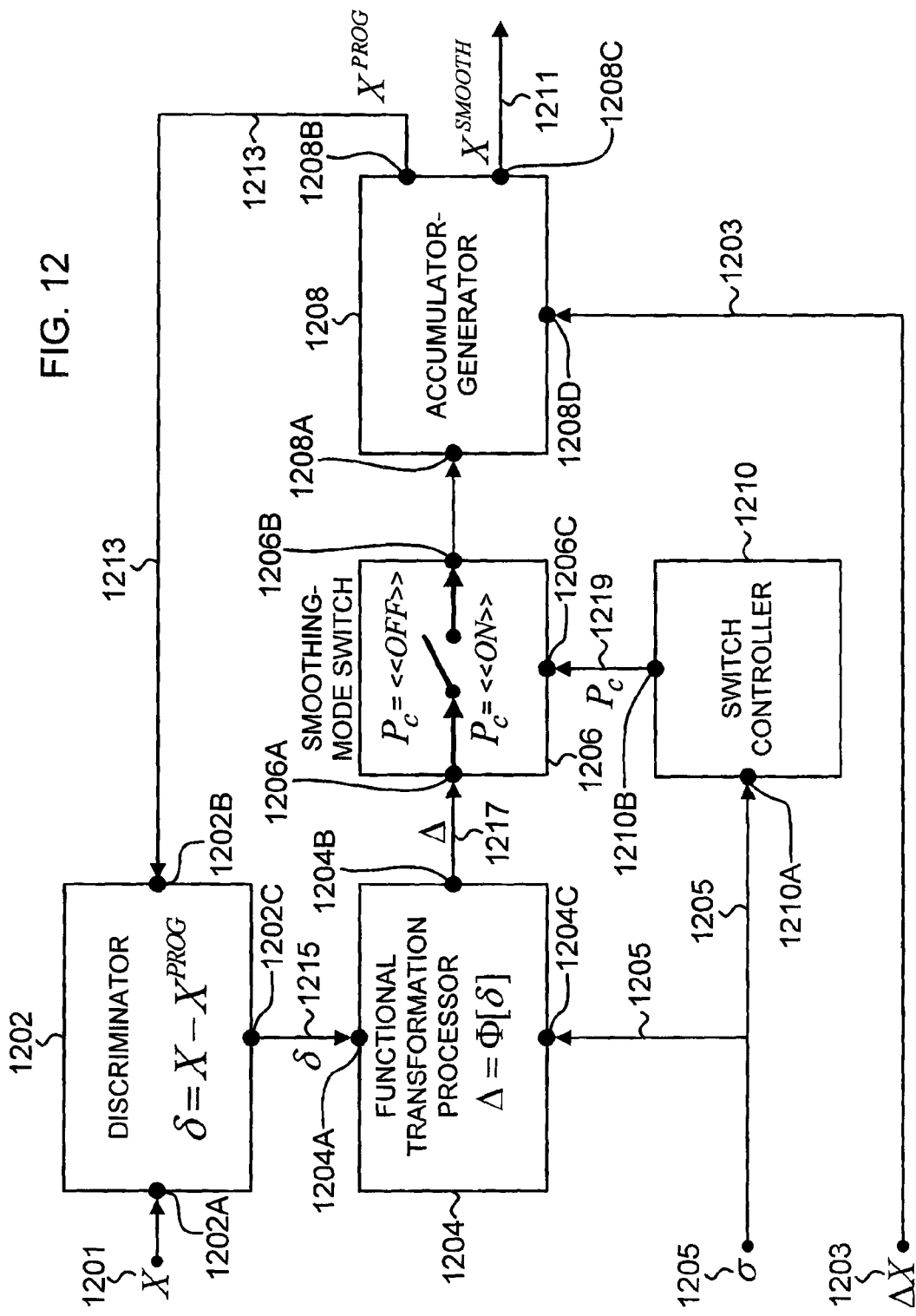
FIG. 12 shows a schematic of a functional block diagram for implementing the method shown in FIG. 11A-FIG. 11D.

FIG. 12 shows a functional block diagram of an embodiment for implementing a recurrent adaptive nonlinear filter (corresponding to the method described by the flowchart in FIG. 11A-FIG. 11D). The recurrent adaptive nonlinear filter includes the following functional blocks:
- a discriminator 1202
- a functional transformation processor 1204
- a smoothing-mode switch 1206
- an accumulator-generator 1208
- a switch controller 1210.

One skilled in the art can construct the recurrent adaptive nonlinear filter from various combinations of hardware, firmware, and software. One skilled in the art can construct the recurrent adaptive nonlinear filter from various electronic components, including one or more general purpose processors (such as microprocessors), one or more digital signal processors, one or more application-specific integrated circuits (ASICs), and one or more field-programmable gate arrays (FPGAs). In some embodiments, each functional block is implemented as a separate device (in this case, a functional block can correspond to a device). In other embodiments, two or more (including all) functional blocks are implemented as a single device.

At each epoch, there are the following inputs to the filter:
X: primary estimates of coordinates 1201 are inputted into input port 1202A of discriminator 1202
ΔX: coordinate increments 1203 are inputted into input port 1208D of accumulator-generator 1208
σ: accuracy estimate 1205 of primary estimates of coordinates is inputted into input port 1210A of switch controller 1210 and input port 1204C of functional transformation processor 1204.

For σ, an estimate generated in solving the positioning task can be used as a current accuracy estimate of primary estimates of coordinates. Another estimate chosen from a set of assigned a priori accuracy estimates depending on solution types can also be used.

The output filter information, the smoothed estimates of coordinates 1211 ($X^{SMOOTH}$), is generated at the output port 1208C of the i accumulator-generator block 1208. The previous smoothed estimates of coordinates is recurrently added to the current coordinate increment (ΔX) for the current epoch to generate the extended estimates of coordinates 1213 ($X^{PROG}$) at the output port 1208B of the accumulator-generator block 1208. The extended estimates of coordinates 1213 are inputted into input port 1202B of the discriminator 1202. The error signal 1215 (δ) is generated as a difference between the primary estimates of coordinates and the extended estimates of coordinates, $\delta = X - X^{PROG}$.

The error signal 1215 is outputted from output port 1202C of the discriminator 1202 and inputted into input port 1204A of the functional transformation processor 1204, which performs a functional transformation of the error signal δ into the correction signal 1217 (Δ). The correction signal 1217 is outputted from output port 1204B of the functional transformation processor 1204 and inputted into input port 1206A of the smoothing-mode switch 1206. Nonlinear units operating according to expressions (E9) or (E11) and parameters of which are calculated in accordance with (E16) and (E17) can be used as functional transformations.

The smoothing-mode switch 1206 is opened and closed in response to a control signal from the switch controller 1210. The control signal 1219 ($P_C$) is generated by the switch controller 1210, outputted from output port 1210B of the switch controller 1210, and inputted into input port 1206C of the smoothing-mode switch 1206. When the smoothing-mode switch 1206 is closed ($P_C$="ON"), the smoothing-mode switch 1206 connects input port 1206A to output port 1206B. When the smoothing-mode switch 1206 is open ($P_C$="OFF"), the smoothing-mode switch 1206 disconnects input port 1206A from output port 1206B.

When $P_C$="ON", the correction signal 1217 (Δ) is inputted into input port 1208A of the accumulator-generator 1208. The correction signal Δ is added to the stored value of $X^{PROG}$ to generate the next smoothed estimates of coordinates: $X^{SMOOTH}=X^{PROG}+\Delta$.

When $P_C$="OFF", the value of $X^{PROG}$ stored in the accumulator-generator 1208 is kept the same; therefore, the next smoothed estimates of coordinates are $X^{SMOOTH}=X^{PROG}$.

As discussed above, the control signal 1219 ($P_C$) generated by the switch controller 1210 can take two opposite values, $P_C$=ON or $P_C$="OFF". There can be different approaches to the control logic of the switch controller 1210 that adapts the filter to changing parameters of primary estimates of coordinates. Two embodiments are discussed below.

First Method. At the initial time instant (that is, at the first epoch), the switch controller 1210 outputs the control signal $P_C$="ON" to the smoothing-mode switch 1206 and sets the threshold accuracy $\sigma_H$ equal to the first current accuracy estimate of primary estimates of coordinates, $\sigma_H=\sigma_{(i=1)}$. For each subsequent i-th epoch:
If the smoothing-mode switch 1206 at the previous (i−1)-th epoch was in the "ON" position, then, at the current i-th epoch:
  if the current accuracy estimate $\sigma_{(i)}$ is greater or equal to the threshold accuracy ($\sigma_{(i)} \geq \sigma_H$), then:
    the switch controller 1210 outputs the control signal $P_C$="OFF" to the smoothing-mode switch 1206; and
    the extension timer $t_{(i)}^{PROG}$ is incremented by the epoch duration, $t_{(i)}^{PROG}=t_{(i-1)}^{PROG}+\Delta t$;
  if the current accuracy estimate $\sigma_{(i)}$ is less than the threshold accuracy, then:
    the switch controller 1210 outputs the control signal $P_C$="ON" to the smoothing-mode switch 1206;
    the smoothing-mode switch 1206 remains in the "ON" position;
    the extension timer is set to $t_{(i)}^{PROG}=0$; and
    the value of the threshold accuracy $\sigma_H$ is set equal to the current accuracy estimate, $\sigma_H=\sigma_{(i)}$.
If the smoothing-mode switch 1206 at the previous (i−1)-th epoch was in the "OFF" position, then, at the current i-th epoch:

if at least one of the following conditions is met:
(a) the current accuracy estimate $\sigma_{(i)}$ of primary estimates of coordinates is less than the value of threshold accuracy, $\sigma_{(i)} < \sigma_H$
(b) the timer value $t_{(i)}^{PROG}$ is greater than the permissible extension time $t_{(i)}^{PROG} > T_{PROG}$, then:
the switch controller 1210 outputs the control signal $P_C$="ON" to the smoothing-mode switch 1206;
if neither condition is met, then:
the switch controller 1210 outputs the control signal $P_C$="OFF" to the smoothing-mode switch 1206;
the smoothing-mode switch 1206 remains in "OFF" position; and
the extension timer is incremented by the epoch duration, $t_{(i)}^{PROG} = t_{(i-1)}^{PROG} + \Delta t$.

Second Method. At the initial time instant (at the first epoch), the control signal $P_C$="ON" is outputted to the smoothing-mode switch 1206, and the threshold accuracy $\sigma_H$ is set equal to the first current accuracy estimate of primary estimates of coordinates, $\sigma_H = \sigma_{(i=1)}$. For each subsequent i-th epoch:
If the smoothing-mode switch 1206 was in the "ON" position at the previous (i−1)-th epoch, then:
if the current accuracy estimate $\sigma_{(i)}$ of primary estimates of coordinates is greater than or equal to the value of the threshold accuracy $\sigma_{(i)} \geq \sigma_H$, then:
the switch controller 1210 outputs the control signal $P_C$="OFF" to the smoothing-mode switch 1206; and
the value of the threshold accuracy $\sigma_H$ is increased by a value proportional to epoch duration, $\sigma_{H(i)} = \sigma_{H(i-1)} + V_D \cdot \Delta t$;
if the current accuracy estimate $\sigma_{(i)}$ of primary estimates of coordinates is less than the value of the threshold accuracy, then:
the switch controller 1210 outputs the control signal $P_C$="ON" to the smoothing-mode switch 1206;
the smoothing-mode switch 1206 remains in the "ON" position; and
the value of the threshold accuracy $\sigma_H$ is set equal to the current accuracy estimate of the primary estimates of coordinates, $\sigma_H = \sigma_{(i)}$.
If the smoothing-mode switch 1206 was in the "OFF" position at the previous (i−1)-th epoch, then, at the current i-th epoch:
if the current accuracy estimate $\sigma_{(i)}$ of primary estimates of coordinates is less than the value of the threshold accuracy $\sigma_{(i)} < \sigma_H$, then:
the switch controller 1210 outputs the control signal $P_C$="ON" to the smoothing-mode switch 1206; and
the value of the threshold accuracy $\sigma_H$ is set equal to the current accuracy estimate of primary estimates of coordinates, $\sigma_H = \sigma_{(i)}$;
if the current accuracy estimate $\sigma_{(i)}$ of primary estimates of coordinates is greater than or equal to the value of the threshold accuracy, $\sigma_{(i)} \geq \sigma_H$, then:
the switch controller 1210 outputs the control signal $P_C$="OFF" to the smoothing-mode switch 1206;
the smoothing-mode switch 1206 remains in the "OFF" position; and
the value of the threshold accuracy $\sigma_H$ is increased by a value proportional to epoch duration, $\sigma_{H(i)} = \sigma_{H(i-1)} + V_D \cdot \Delta t$.

The two methods described above differ in the logical conditions that determine the duration of opening the smoothing loop. In the first method, the assigned extension time determines this logic; in the second method, the average rate of extended coordinate degradation determines this logic. Both values depend strongly on the navigation receiver type and the method of generating increments over an epoch. For high-grade receivers, appropriate extension times fall within a range $T^{PROG}$ of about 1000-1500 sec; and appropriate degradation rates of extended coordinates fall within a range $V_D$ of about $(1.5-2.0) \cdot 10^{-4}$ m/s. Considering the above-mentioned parameters of functional transformation, the above values guarantee acceptable quality of filter operation both in accuracy and smoothness.

Figure 13:
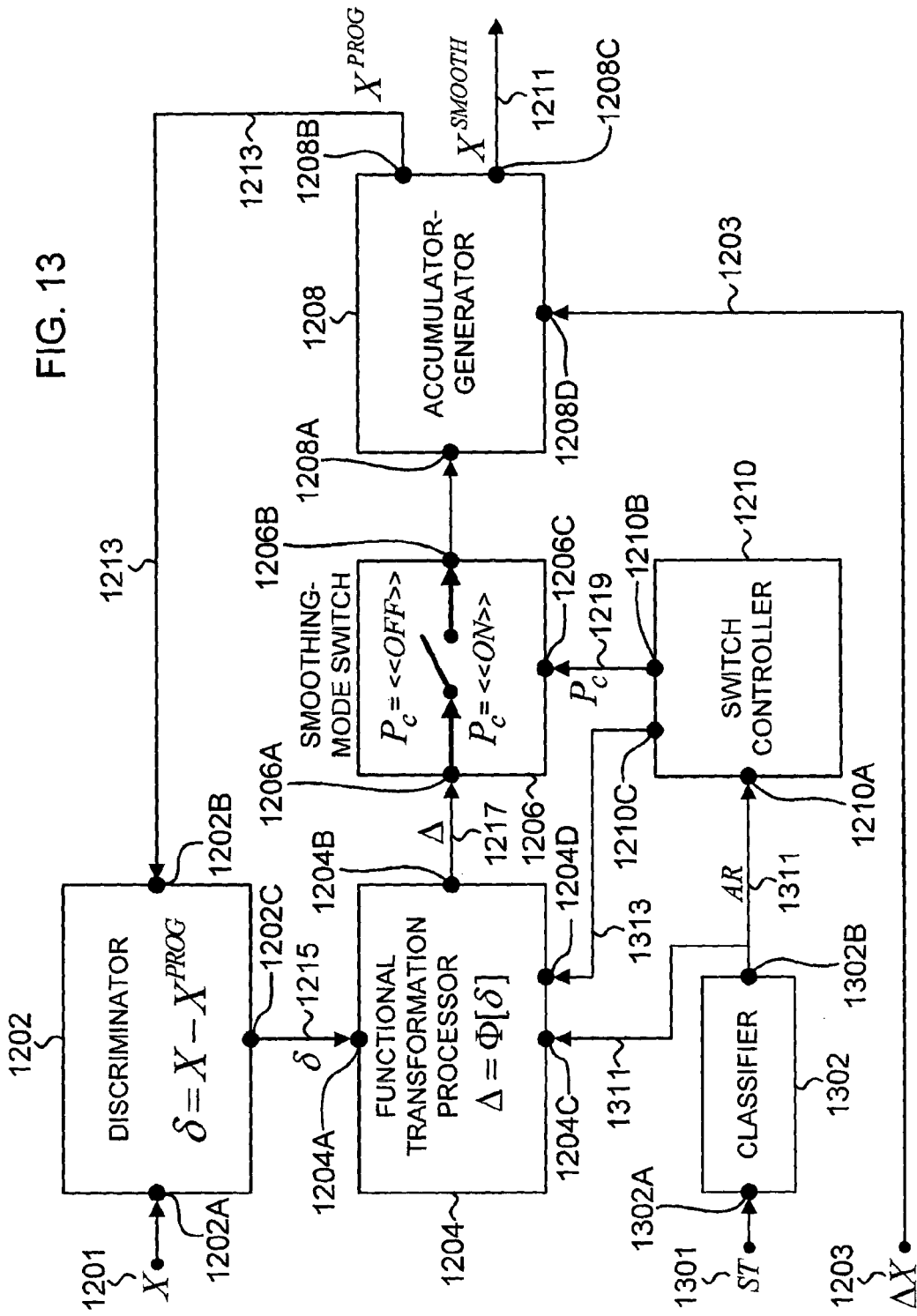
FIG. 13 shows a schematic of a functional block diagram for implementing the method shown in FIG. 3A-FIG. 3D.

FIG. 13 shows a functional diagram of a second embodiment for implementing a recurrent adaptive nonlinear filter. This embodiment is suited for navigation receivers that transmit "solution type" information instead of accuracy estimates for the primary estimates of coordinates. The functional blocks previously shown in FIG. 12 are present. The classifier 1302 is added.

At each epoch, a current solution type (ST) 1301 designation is inputted into input 1302A of the classifier 1302, which assigns the solution type to a classification designated by an accuracy rating (AR) value 1311. Different classification rules were discussed above. In the convention used in this example, the most accurate solution type has the lowest value of accuracy rating, AR=1. For less accurate solution types, the AR value will be greater. The AR numeric values are applied to logic devices of the adaptive filter. The AR value 1311 is outputted from output port 1302B of the classifier 1302 and inputted into input port 1210A of the switch controller 1210 and also inputted into input port 1204C of the functional transformation processor 1204.

The switch controller 1210 switches modes of filter operation and outputs control signal 1219 ($P_C$) from output port 1210B of the switch controller 1210 to input port 1206C of the smoothing-mode switch 1206. When $P_C$="ON", the smoothing-mode switch 1206 closes. When $P_C$="OFF", the smoothing-mode switch 1206 opens. Generation of the control signal $P_C$ is implemented in accordance with a logic rule given below.

At the initial time instant (that is, at the first epoch), the switch controller 1210 outputs the control signal "ON" to the smoothing-mode switch 1206. The threshold accuracy rating $AR_H$ is set to the current accuracy rating, $AR_H = AR_{(i)}$, and the extension timer is set to zero, $t_{PROG} = 0$. For each subsequent i-th epoch:
If the smoothing-mode switch 1206 was in the "ON" position at the previous (i−1)-th epoch, then, at the current i-th epoch:
if the accuracy rating $AR_{(i)}$ is greater than the threshold accuracy rating, $AR_{(i)} > AR_H$, then:
the switch controller 1210 outputs the control signal $P_C$="OFF" to the smoothing-mode switch; and
the extension timer $t_{PROG}$ is incremented by the epoch duration $\Delta t$, $t_{(i)}^{PROG} = t_{(i-1)}^{PROG} + \Delta t$;
if the accuracy rating $AR_{(i)}$ is not greater than the threshold accuracy rating, then:
the switch controller outputs the control signal $P_C$="ON" to the smoothing-mode switch 1206;
the smoothing-mode switch 1206 keeps the "ON" position;
the extension timer is set to zero, $t_{(i)}^{PROG} = 0$; and
the threshold accuracy rating $AR_H$ is set equal to the current accuracy rating $AR_H = AR_{(i)}$.

If the smoothing-mode switch was in the "OFF" position at the previous (i−1)-th epoch, then:
  if at least one of the following conditions is met:
    (a) the current accuracy rating $AR_{(i)}$ is less than the threshold accuracy rating $AR_H$: $AR_{(i)} < AR_H$
    (b) the timer value $t_{(i)}^{PROG}$ is greater than the permitted extension time $t_{(i)}^{PROG} > T^{PROG}$, then:
      the switch controller 1210 outputs the control signal $P_C=$"ON" to the smoothing-mode switch 1206;
  if neither condition is met, then:
    the switch controller 1210 outputs the control signal $P_C=$"OFF" to the smoothing-mode switch 1206;
    the smoothing mode switch keeps the "OFF" position; and
    the extension timer is increased by the epoch duration $\Delta t$, $t_{(i)}^{PROG} = t_{(i-1)}^{PROG} + \Delta t$.

As in FIG. 12, the functional transformation processor 1204 transforms the error signal 1215 into the correction signal 1217. In this embodiment, however, the nonlinearity of transformation can be described by (E9), (E10), or (E11). The parameters of nonlinearities for (E9) or (E11) at each epoch are chosen from a previously assigned set of values depending on the current accuracy rating $AR_{(i)}$. For nonlinearity (E10), only the transfer gain $K_2(t)$ is a variable in time. A signal to trigger a counter (timer) for the time t can be sent at the instant the value of the control signal $P_C$ changes from $P_C=$"OFF" to $P_C=$"ON". This signal can be sent via switching data 1313 outputted from output port 1210C of the switch controller 1210 and inputted into input port 1204D of functional transformation processor 1204. Switching data 1313 includes information on the instants at which the control signal changes state.

Figure 14:
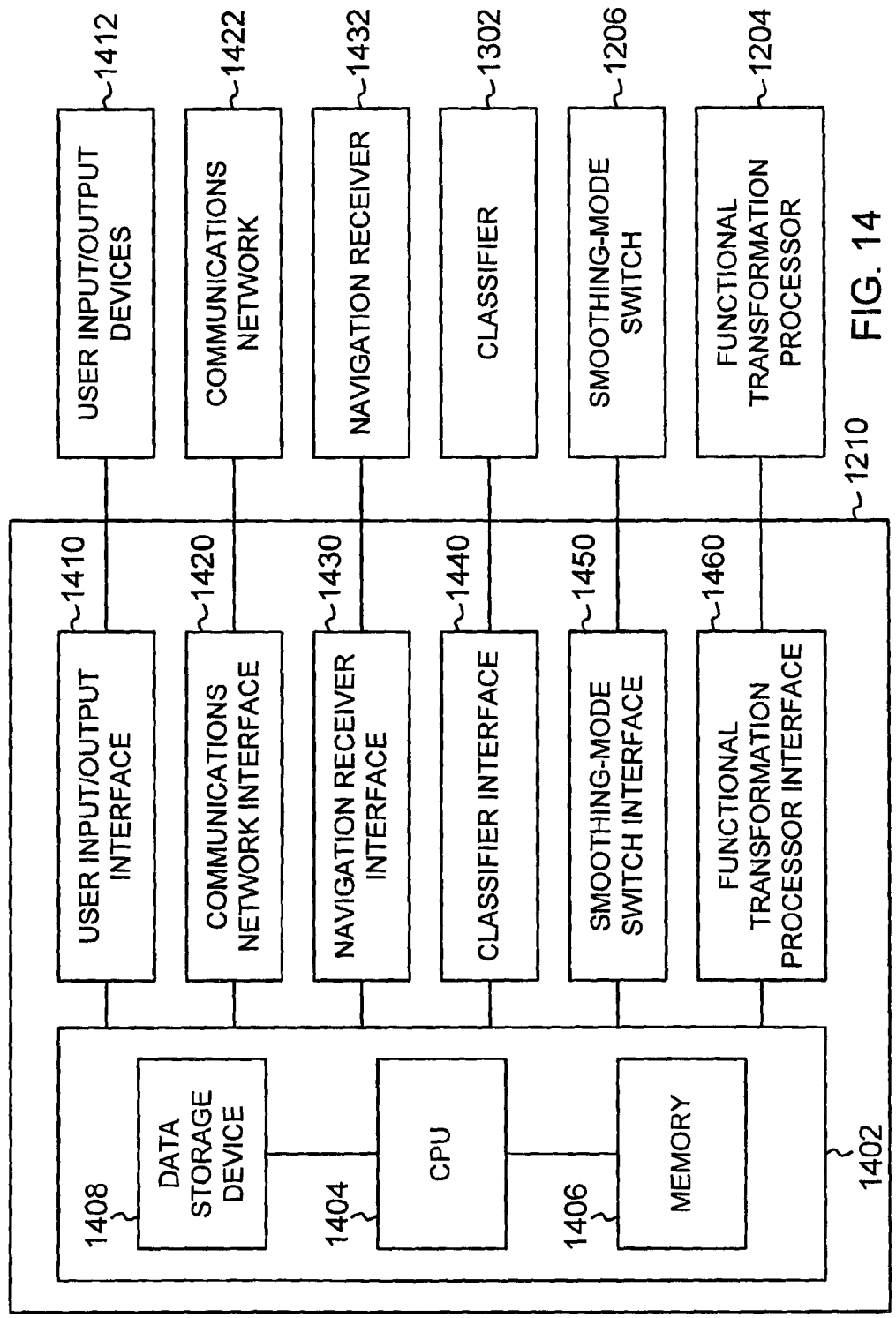
FIG. 14 shows a schematic of a switch controller implemented with a computer.

An embodiment of the switch controller 1210 is shown in FIG. 14. One skilled in the art can construct the switch controller 1210 from various combinations of hardware, firmware, and software. One skilled in the art can construct the switch controller 1210 from various electronic components, including one or more general purpose processors (such as microprocessors), one or more digital signal processors, one or more application-specific integrated circuits (ASICs), and one or more field-programmable gate arrays (FPGAs).

The switch controller unit 1210 includes a computer 1402, which includes a processor [referred to as the central processing unit (CPU)] 1404, memory 1406, and a data storage device 1408. The data storage device 1408 includes at least one persistent, non-transitory, tangible computer readable medium, such as non-volatile semiconductor memory, a magnetic hard drive, or a compact disc read only memory.

The switch controller unit 1210 further includes a user input/output interface 1410, which interfaces the computer 1402 to user input/output devices 1412. Examples of user input/output devices 1412 include a keyboard, a mouse, a local access terminal, and a video display. Data, including computer executable code, can be transferred to and from the computer 1402 via the user input/output interface 1410.

The switch controller 1210 further includes a communications network interface 1420, which interfaces the computer 1402 with a communications network 1422. Examples of the communications network 1422 include a local area network and a wide area network. A user can access the computer 1402 via a remote access terminal (not shown) communicating with the communications network 1422. Data, including computer executable code, can be transferred to and from the computer 1402 via the communications network interface 1420.

The switch controller 1210 further includes a navigation receiver interface 1430, which interfaces the computer 1402 with a navigation receiver 1432. The accuracy estimate σ 1205 (FIG. 12), for example, can be transmitted from the navigation receiver 1432.

The switch controller 1210 further includes a classifier interface 1440, which interfaces the computer 1402 with the classifier 1302 (FIG. 13).

The switch controller 1210 further includes a smoothing-mode switch interface 1450, which interfaces the computer 1402 with the smoothing-mode switch 1206 (FIG. 12 and FIG. 13).

The switch controller 1210 further includes a functional transformation processor interface 1460, which interfaces the computer 1402 with the functional transformation processor 1204 (FIG. 12 and FIG. 13).

As is well known, a computer operates under control of computer software, which defines the overall operation of the computer and applications. The CPU 1404 controls the overall operation of the computer and applications by executing computer program instructions that define the overall operation and applications. The computer program instructions can be stored in the data storage device 1408 and loaded into the memory 1406 when execution of the program instructions is desired. The algorithms shown schematically in FIG. 3A-FIG. 3D and in FIG. 11A-FIG. 11D can be defined by computer program instructions stored in the memory 1406 or in the data storage device 1408 (or in a combination of the memory 1406 and the data storage device 1408) and controlled by the CPU 1404 executing the computer program instructions. For example, the computer program instructions can be implemented as computer executable code programmed by one skilled in the art to perform algorithms. Accordingly, by executing the computer program instructions, the CPU 1404 executes the algorithms shown schematically in FIG. 3A-FIG. 3D and in FIG. 11A-FIG. 11D.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for improving a positioning quality of a global navigation satellite system navigation receiver operating in a differential navigation mode, wherein for each epoch in a plurality of epochs, the global navigation satellite system receiver transmits primary estimates of coordinates and a solution type, wherein the solution type is one of a plurality of solution types, and wherein each solution type in the plurality of solution types has a corresponding accuracy of the primary estimates of coordinates, the method comprising the steps of:
  at the first epoch in the plurality of epochs:
    receiving the first-epoch primary estimates of coordinates;
    receiving the first-epoch solution type;

assigning a first-epoch group accuracy to the first-epoch solution type, wherein the first-epoch group accuracy is one of a plurality of group accuracies; and generating first-epoch smoothed estimates of coordinates equal to the first-epoch primary estimates of coordinates; and for each current epoch after the first epoch in the plurality of epochs:

receiving smoothed estimates of coordinates calculated at the epoch before the current epoch;

receiving the current-epoch primary estimates of coordinates;

receiving the current-epoch solution type;

assigning a current-epoch group accuracy to the current-epoch solution type, wherein the current-epoch group accuracy is one of the plurality of group accuracies;

calculating, based at least in part on carrier phases of satellite signals received by the global navigation satellite system navigation receiver, coordinate increments between coordinates at the current epoch and coordinates at the epoch before the current epoch;

generating current-epoch extended estimates of coordinates based on a sum of the smoothed estimates of coordinates calculated at the epoch before the current epoch and the coordinate increments;

determining a last change epoch, wherein the group accuracy at the last change epoch was different from the group accuracy at the epoch before the last change epoch;

determining whether a first condition is satisfied, wherein the first condition is that the group accuracy at the last change epoch was lower than the group accuracy at the epoch before the last change epoch;

determining an elapsed time as a difference between the current epoch and the last change epoch;

determining whether a second condition is satisfied, wherein the second condition is that the elapsed time does not exceed a predetermined maximum value of elapsed time;

upon determining that the first condition and the second condition are both satisfied:

generating current-epoch smoothed estimates of coordinates equal to the current-epoch extended estimates of coordinates; and upon determining that at least one of the first condition and the second condition is not satisfied:

generating an error signal based on a difference between the current-epoch primary estimates of coordinates and the current-epoch extended estimates of coordinates;

functionally transforming the error signal into a correction signal; and generating updated smoothed coordinates based on a sum of the current-epoch extended estimates of coordinates and the correction signal.

2. The method of claim 1, wherein:
the number of group accuracies in the plurality of group accuracies is equal to the number of solution types in the plurality of solution types; and
each group accuracy in the plurality of group accuracies is assigned to one and only one solution type in the plurality of solution types.

3. The method of claim 2, wherein the step of functionally transforming the error signal into a correction signal comprises the steps of:
comparing the absolute value of the error signal to a limit threshold;
upon determining that the absolute value of the error signal is less than or equal to the limit threshold:
generating the correction signal based on a product of the error signal multiplied by a transfer gain; and
upon determining that the absolute value of the error signal is greater than the limit threshold:
generating the correction signal based on a product of the sign of the error signal multiplied by a limit level.

4. The method of claim 3, wherein:
the limit threshold is based on the current-epoch group accuracy;
the transfer gain is based on the current-epoch group accuracy; and
the limit level is a user-defined value.

5. The method of claim 1, wherein:
the plurality of group accuracies consists of a first group accuracy and a second group accuracy;
the first group accuracy is assigned to the solution type with the highest accuracy; and
the second group accuracy is assigned to all the solution types with accuracies lower than the highest accuracy.

6. The method of claim 5, wherein the step of functionally transforming the error signal into a correction signal comprises the steps of:
comparing the absolute value of the error signal to a limit threshold;
upon determining that the absolute value of the error signal is less than or equal to the limit threshold:
generating the correction signal based on a product of the error signal multiplied by a transfer gain; and
upon determining that the absolute value of the error signal is greater than the limit threshold:
generating the correction signal based on
a product of the sign of the error signal multiplied by the transfer gain and multiplied by a limit level.

7. The method of claim 6, wherein:
the limit threshold is a first user-defined value;
the limit level is a second user-defined value; and
the transfer gain is based on the elapsed time.

8. The method of claim 1, wherein the step of functionally transforming the error signal into a correction signal comprises the steps of:
calculating a product of the error signal multiplied by a transfer gain and multiplied by a power function of a limit threshold;
calculating the absolute value of the error signal;
calculating a sum of the power function of the absolute value and the power function of the limit threshold; and
generating the correction signal based on a ratio of the product divided by the sum.

9. The method of claim 8, wherein:
the limit threshold is a first user-defined value;
the transfer gain is a second user-defined value;
the power function of the limit threshold is the limit threshold raised to a user-defined exponent; and
the power function of the absolute value is the absolute value raised to the user-defined exponent.

10. The method of claim 8, wherein:
the limit threshold is based on the current-epoch group accuracy;
the transfer gain is based on the current-epoch group accuracy;

the power function of the limit threshold is the limit threshold raised to a user-defined exponent; and the power function of the absolute value is the absolute value raised to the user-defined exponent.

11. An apparatus for improving a positioning quality of a global navigation satellite system navigation receiver operating in a differential navigation mode, wherein for each epoch in a plurality of epochs, the global navigation satellite system receiver transmits primary estimates of coordinates and a solution type, wherein the solution type is one of a plurality of solution types, and wherein each solution type in the plurality of solution types has a corresponding accuracy of the primary estimates of coordinates, the apparatus comprising:

means for, at the first epoch in the plurality of epochs:
receiving the first-epoch primary estimates of coordinates;
receiving the first-epoch solution type;
assigning a first-epoch group accuracy to the first-epoch solution type, wherein the first-epoch group accuracy is one of a plurality of group accuracies; and
generating first-epoch smoothed estimates of coordinates equal to the first-epoch primary estimates of coordinates; and means for, for each current epoch after the first epoch in the plurality of epochs:
receiving smoothed estimates of coordinates calculated at the epoch before the current epoch;
receiving the current-epoch primary estimates of coordinates;
receiving the current-epoch solution type;
assigning a current-epoch group accuracy to the current-epoch solution type, wherein the current-epoch group accuracy is one of the plurality of group accuracies;
calculating, based at least in part on carrier phases of satellite signals received by the global navigation satellite system navigation receiver, coordinate increments between coordinates at the current epoch and coordinates at the epoch before the current epoch;
generating current-epoch extended estimates of coordinates based on a sum of the smoothed estimates of coordinates calculated at the epoch before the current epoch and the coordinate increments;
determining a last change epoch, wherein the group accuracy at the last change epoch was different from the group accuracy at the epoch before the last change epoch;
determining whether a first condition is satisfied, wherein the first condition is that the group accuracy at the last change epoch was lower than the group accuracy at the epoch before the last change epoch;
determining an elapsed time as a difference between the current epoch and the last change epoch;
determining whether a second condition is satisfied, wherein the second condition is that the elapsed time does not exceed a predetermined maximum value of elapsed time;
upon determining that the first condition and the second condition are both satisfied:
generating current-epoch smoothed estimates of coordinates equal to the current-epoch extended estimates of coordinates; and
upon determining that at least one of the first condition and the second condition is not satisfied:
generating an error signal based on a difference between the current-epoch primary estimates of coordinates and the current-epoch extended estimates of coordinates;
functionally transforming the error signal into a correction signal; and
generating updated smoothed coordinates based on a sum of the current-epoch extended estimates of coordinates and the correction signal.

12. The apparatus of claim 11, wherein:
the number of group accuracies in the plurality of group accuracies is equal to the number of solution types in the plurality of solution types; and
each group accuracy in the plurality of group accuracies is assigned to one and only one solution type in the plurality of solution types.

13. The apparatus of claim 12, wherein the means for functionally transforming the error signal into a correction signal comprises:
means for comparing the absolute value of the error signal to a limit threshold;
means for, upon determining that the absolute value of the error signal is less than or equal to the limit threshold:
generating the correction signal based on a product of the error signal multiplied by a transfer gain; and
means for, upon determining that the absolute value of the error signal is greater than the limit threshold:
generating the correction signal based on a product of the sign of the error signal multiplied by a limit level.

14. The apparatus of claim 13, wherein:
the limit threshold is based on the current-epoch group accuracy;
the transfer gain is based on the current-epoch group accuracy; and
the limit level is a user-defined value.

15. The apparatus of claim 11, wherein:
the plurality of group accuracies consists of a first group accuracy and a second group accuracy;
the first group accuracy is assigned to the solution type with the highest accuracy; and
the second group accuracy is assigned to all the solution types with accuracies lower than the highest accuracy.

16. The apparatus of claim 15, wherein the means for functionally transforming the error signal into a correction signal comprises:
means for comparing the absolute value of the error signal to a limit threshold;
means for, upon determining that the absolute value of the error signal is less than or equal to the limit threshold:
generating the correction signal based on a product of the error signal multiplied by a transfer gain; and
means for, upon determining that the absolute value of the error signal is greater than the limit threshold:
generating the correction signal based on
a product of the sign of the error signal multiplied by the transfer gain and multiplied by a limit level.

17. The apparatus of claim 16, wherein:
the limit threshold is a first user-defined value;
the limit level is a second user-defined value; and
the transfer gain is based on the elapsed time.

18. The apparatus of claim 11, wherein the means for functionally transforming the error signal into a correction signal comprises:
means for calculating a product of the error signal multiplied by a transfer gain and multiplied by a power function of a limit threshold;

means for calculating the absolute value of the error signal;

means for calculating a sum of the power function of the absolute value and the power function of the limit threshold; and means for generating the correction signal based on a ratio of the product divided by the sum.

19. The apparatus of claim 18, wherein:
the limit threshold is a first user-defined value;
the transfer gain is a second user-defined value;
the power function of the limit threshold is the limit threshold raised to a user-defined exponent; and
the power function of the absolute value is the absolute value raised to the user-defined exponent.

20. The apparatus of claim 18, wherein:
the limit threshold is based on the current-epoch group accuracy;
the transfer gain is based on the current-epoch group accuracy;
the power function of the limit threshold is the limit threshold raised to a user-defined exponent; and
the power function of the absolute value is the absolute value raised to the user-defined exponent.

21. A non-transitory computer readable medium storing computer program instructions for improving a positioning quality of a global navigation satellite system navigation receiver operating in a differential navigation mode, wherein for each epoch in a plurality of epochs, the global navigation satellite system receiver transmits primary estimates of coordinates and a solution type, wherein the solution type is one of a plurality of solution types, and wherein each solution type in the plurality of solution types has a corresponding accuracy of the primary estimates of coordinates, the computer program instructions defining the steps of:
at the first epoch in the plurality of epochs:
receiving the first-epoch primary estimates of coordinates;
receiving the first-epoch solution type;
assigning a first-epoch group accuracy to the first-epoch solution type, wherein the first-epoch group accuracy is one of a plurality of group accuracies; and
generating first-epoch smoothed estimates of coordinates equal to the first-epoch primary estimates of coordinates; and
for each current epoch after the first epoch in the plurality of epochs:
receiving smoothed estimates of coordinates calculated at the epoch before the current epoch;
receiving the current-epoch primary estimates of coordinates;
receiving the current-epoch solution type;
assigning a current-epoch group accuracy to the current-epoch solution type, wherein the current-epoch group accuracy is one of the plurality of group accuracies;
calculating, based at least in part on carrier phases of satellite signals received by the global navigation satellite system navigation receiver, coordinate increments between coordinates at the current epoch and coordinates at the epoch before the current epoch;
generating current-epoch extended estimates of coordinates based on a sum of the smoothed estimates of coordinates calculated at the epoch before the current epoch and the coordinate increments;

determining a last change epoch, wherein the group accuracy at the last change epoch was different from the group accuracy at the epoch before the last change epoch;
determining whether a first condition is satisfied, wherein the first condition is that the group accuracy at the last change epoch was lower than the group accuracy at the epoch before the last change epoch;
determining an elapsed time as a difference between the current epoch and the last change epoch;
determining whether a second condition is satisfied, wherein the second condition is that the elapsed time does not exceed a predetermined maximum value of elapsed time;
upon determining that the first condition and the second condition are both satisfied:
generating current-epoch smoothed estimates of coordinates equal to the current-epoch extended estimates of coordinates; and
upon determining that at least one of the first condition and the second condition is not satisfied:
generating an error signal based on a difference between the current-epoch primary estimates of coordinates and the current-epoch extended estimates of coordinates;
functionally transforming the error signal into a correction signal; and
generating updated smoothed coordinates based on a sum of the current-epoch extended estimates of coordinates and the correction signal.

22. The non-transitory computer readable medium of claim 21, wherein:
the number of group accuracies in the plurality of group accuracies is equal to the number of solution types in the plurality of solution types; and
each group accuracy in the plurality of group accuracies is assigned to one and only one solution type in the plurality of solution types.

23. The non-transitory computer readable medium of claim 22, wherein the computer program instructions defining the step of functionally transforming the error signal into a correction signal comprises computer program instructions defining the steps of:
comparing the absolute value of the error signal to a limit threshold;
upon determining that the absolute value of the error signal is less than or equal to the limit threshold:
generating the correction signal based on a product of the error signal multiplied by a transfer gain; and
upon determining that the absolute value of the error signal is greater than the limit threshold:
generating the correction signal based on a product of the sign of the error signal multiplied by a limit level.

24. The non-transitory computer readable medium of claim 23, wherein:
the limit threshold is based on the current-epoch group accuracy;
the transfer gain is based on the current-epoch group accuracy; and
the limit level is a user-defined value.

25. The non-transitory computer readable medium of claim 21, wherein:
the plurality of group accuracies consists of a first group accuracy and a second group accuracy;
the first group accuracy is assigned to the solution type with the highest accuracy; and the second group accuracy is assigned to all the solution types with accuracies lower than the highest accuracy.

26. The non-transitory computer readable medium of claim 25, wherein the computer program instructions defining the step of functionally transforming the error signal into a correction signal comprises computer program instructions defining the steps of:
comparing the absolute value of the error signal to a limit threshold;
upon determining that the absolute value of the error signal is less than or equal to the limit threshold:
generating the correction signal based on a product of the error signal multiplied by a transfer gain; and
upon determining that the absolute value of the error signal is greater than the limit threshold:
generating the correction signal based on
a product of the sign of the error signal multiplied by the transfer gain and multiplied by a limit level.

27. The non-transitory computer readable medium of claim 26, wherein:
the limit threshold is a first user-defined value;
the limit level is a second user-defined value; and
the transfer gain is based on the elapsed time.

28. The non-transitory computer readable medium of claim 21, wherein the computer program instructions defining the step of functionally transforming the error signal into a correction signal comprises computer program instructions defining the steps of:
calculating a product of the error signal multiplied by a transfer gain and multiplied by a power function of a limit threshold;
calculating the absolute value of the error signal;
calculating a sum of the power function of the absolute value and the power function of the limit threshold; and
generating the correction signal based on a ratio of the product divided by the sum.

29. The non-transitory computer readable medium of claim 28, wherein:
the limit threshold is a first user-defined value;
the transfer gain is a second user-defined value;
the power function of the limit threshold is the limit threshold raised to a user-defined exponent; and
the power function of the absolute value is the absolute value raised to the user-defined exponent.

30. The non-transitory computer readable medium of claim 28, wherein:
the limit threshold is based on the current-epoch group accuracy;
the transfer gain is based on the current-epoch group accuracy;
the power function of the limit threshold is the limit threshold raised to a user-defined exponent; and
the power function of the absolute value is the absolute value raised to the user-defined exponent.

* * * * *